(12) United States Patent
Oh

(10) Patent No.: US 11,169,674 B2
(45) Date of Patent: Nov. 9, 2021

(54) ELECTRONIC APPARATUS, METHOD OF CONTROLLING THE SAME AND RECORDING MEDIUM THEREOF

(71) Applicant: SAMSUNG ELECTRONICS CO., LTD., Suwon-si (KR)

(72) Inventor: Sungbo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/427,501

(22) Filed: May 31, 2019

(65) Prior Publication Data
US 2019/0377480 A1 Dec. 12, 2019

(30) Foreign Application Priority Data
Jun. 11, 2018 (KR) .......................... 10-2018-0066614

(51) Int. Cl.
G06F 21/10 (2013.01)
G06F 3/0484 (2013.01)
G06F 9/30 (2018.01)

(52) U.S. Cl.
CPC ........ G06F 3/04845 (2013.01); G06F 9/3004 (2013.01)

(58) Field of Classification Search
CPC combination set(s) only.
See application file for complete search history.

(56) References Cited

U.S. PATENT DOCUMENTS

| | | | |
|---|---|---|---|
| 2001/0029568 A1 | 10/2001 | La | |
| 2002/0146125 A1* | 10/2002 | Eskicioglu | H04N 21/4516 380/255 |
| 2004/0109569 A1* | 6/2004 | Ellison | G11B 20/00086 380/277 |
| 2005/0165689 A1* | 7/2005 | Krasinski | G11B 20/00086 705/57 |
| 2006/0248595 A1* | 11/2006 | Kelly | G11B 20/00086 726/27 |
| 2008/0092210 A1* | 4/2008 | Tobita | G06F 21/572 726/2 |
| 2008/0170840 A1 | 7/2008 | Kaneko et al. | |
| 2009/0034942 A1 | 2/2009 | Ikeda et al. | |
| 2013/0219192 A1 | 8/2013 | Park et al. | |
| 2014/0208096 A1* | 7/2014 | Brandwine | G06F 21/602 713/156 |
| 2015/0295966 A1 | 10/2015 | Wong et al. | |
| 2017/0102895 A1 | 4/2017 | Kim | |
| 2018/0204009 A1* | 7/2018 | Xu | G06F 21/51 |

OTHER PUBLICATIONS

International Search Report and Written Opinion (PCT/ISA/210 and PCT/ISA/237), dated Oct. 4, 2019 by International Searching Authority in International Application No. PCT/KR2019/006941.

* cited by examiner

*Primary Examiner* — Hien L Duong
(74) *Attorney, Agent, or Firm* — Sughrue Mion, PLLC

(57) ABSTRACT

Disclosed is an electronic apparatus including: a first storage stored with a first code; a second storage; and a processor configured to: read the first code from the first storage and store the read first code in a secured area of the second storage, compare the first code stored in the secured area with a second code obtained from an outside, and based on matching between the first code stored in the secured area and the second code, control an operation to be performed.

23 Claims, 14 Drawing Sheets

ELECTRONIC APPARATUS, METHOD OF CONTROLLING THE SAME AND RECORDING MEDIUM THEREOF

CROSS-REFERENCE TO RELATED THE APPLICATION

This application is based on and claims priority under 35 U.S.C. § 119 to Korean Patent Application No. 10-2018-0066614 filed on Jun. 11, 2018 in the Korean Intellectual Property Office, the disclosure of which is incorporated by reference herein in its entirety.

BACKGROUND

Field

Apparatuses and methods consistent with the embodiments relate to an electronic apparatus, a method of controlling the same, and a recording medium thereof, and more particularly to an electronic apparatus capable of processing an image signal of content, a method of controlling the same, and a recording medium thereof.

Description of the Related Art

An electronic apparatus such as a reproducer, i.e. a player for a digital versatile disc (DVD), a Blu-ray disc (BD) or the like optical disc, processes an image signal corresponding to digital content stored in the disc through a wired or wireless interface and provides the processed signal to an external apparatus such as a television (TV).

Generally, it is easy to store and copy the digital content, and therefore copyright protection is needed for the digital content.

Specifically, a manufacturer of a reproducer installs firmware to set and store information about an inherent code corresponding to a sales region, and then sells the reproducer. Further, a disc is recorded with not only content but also inherent code information showing a region where the reproduction of the content is allowable.

The reproducer normally reproduces content when the code stored in the disc matches the code set in the reproducer. In other words, a mismatch between both codes makes it impossible to reproduce the content recorded in the disc. For example, the reproducer on sale in America is controlled to reproduce only content of a disc having an inherent code, e.g. a DVD having a region code of '1' and a BD having a region code of 'A'.

However, a case of illegally adding a microprocessor circuit to an optical disc reproducer and hacking an inherent code set to the reproducer has recently been found. In this case, the code set to the reproducer is arbitrarily changed so that content distributed through an abnormal channel can be reproduced in the reproducer, thereby infringing the copyright of the content.

SUMMARY

According to an aspect of the disclosure, there is provided an electronic apparatus comprising: a first storage stored with a first code; a second storage comprising a secured area; and a processor configured to: read the first code from the first storage and store the read first code in the secured area of the second storage, compare the first code stored in the secured area of the second storage with a second code obtained from outside the secured area of the second storage, and based on matching between the first code stored in the secured area of the second storage and the second code, perform an operation.

The secured area of the second storage restricts an access of a first operating system (OS), and based on execution of a second OS different from the first OS, the processor may store the first code in the secured area of the second storage and reads the stored first code from the secured area of the second storage.

The processor may comprise a trust zone which is distinguished from a normal area and in which the second OS is executed.

The processor may comprise a first processor configured to operate the first OS, and a second processor configured to operate the second OS.

Based on occurrence of an event corresponding to first booting of the electronic apparatus or a user's input, the processor may read the first code from the first storage and stores the read first code in the secured area of the second storage.

The first code stored in the secured area of the second storage may be maintained without change in a value.

The first code may be encrypted and stored in the secured area of the second storage.

The processor may be further configured to: compare the first code stored in the secured area of the second storage with the first code of the first storage, and control the electronic apparatus to stop operating based on mismatching between the first code stored in the secured area and the first code of the first storage.

The processor may be further configured to control the comparison between the first code of the secured area of the second storage and the first code of the first storage to be made on a predetermined cycle.

The electronic apparatus may further comprise: an image processor configured to process an image signal, wherein the processor may be further configured to: read the second code from a predetermined area of a disc stored with content, and based on matching between the first code and the second code, control the image processor to process the image signal corresponding to the content.

According to another aspect of the disclosure, there is provided a method of controlling an electronic apparatus, the method comprising:

storing a first code, which is read from a first storage, in a secured area of a second storage;

receiving an input for a predetermined operation;

comparing the first code stored in the secured area of the second storage with a second code obtained from outside the secured area of the second storage; and performing an operation corresponding to the input based on matching between the first code stored in the secured area of the second storage and the second code according to results of the comparison.

The secured area of the second storage may restrict an access of a first operating system (OS), the storing my comprise storing the first code in the secured area of the second storage based on execution of a second OS different from the first OS, and the comparing may comprise reading the stored first code from the secured area of the second storage based on the execution of the second OS.

A processor of the electronic apparatus may comprise a trust zone which is distinguished from a normal area and in which the second OS is executed.

A processor of the electronic apparatus may comprise a first processor to operate the first OS, and a second processor to operate the second OS.

The method may further comprise: detecting occurrence of an event corresponding to first booting of the electronic apparatus or a user's input; and reading the first code from the first storage and storing the read first code in the secured area of the second storage based on the detection of the event.

The first code stored in the secured area may be maintained without change in a value.

The method may further comprise: encrypting and storing the first code in the secured area.

The method may further comprise: controlling the electronic apparatus to stop operating based on mismatching in comparison between the first code stored in the secured area of the second storage and the first code of the first storage.

The method may further comprise: reading the second code from a predetermined area of a disc stored with content; and processing the image signal corresponding to the content based on matching between the first code and the second code.

According to another aspect of the disclosure, there is provided a computer-readable nonvolatile recording medium recorded with a program of a method executable by a processor of an electronic apparatus, the method comprising: storing a first code, which is read from a first storage, in a secured area of a second storage; receiving an input for a predetermined operation; comparing the first code stored in the secured area of the second storage with a second code obtained from outside the secured area of the second storage; and performing an operation corresponding to the input based on matching between the first code stored in the secured area of the second storage and the second code according to results of the comparison.

According to another aspect of the disclosure, there is provided an electronic apparatus comprising: a first storage storing a first code; a second storage comprising a secured area; and a processor configured to: execute a first operating system (OS) configured to perform first operations;

execute a second OS configured to perform second operations, the second OS configured to provide higher security than the first OS; only read the first code from the first storage and store the first code in the secured area of the second storage as second code during the execution of the second OS; receive a request for reproducing a content; retrieve the second code from the secured area of the second storage; retrieve a third code associated with the content; compare the second code with the third code associated with the content; and reproduce the content based on a result of the comparison between the second code and the third code.

The processor may be further configured to control a display to display the content based on the result of the comparison between the second code and the third code.

The first code may read from the first storage and stored in the second storage only when the electronic device is turned on for a first time.

The first storage may be pre-stored with the first code during manufacturing of the electronic apparatus.

According to another aspect of the disclosure, there is provided an electronic apparatus comprising: a first storage storing a first code; a second storage comprising a secured area; and a processor configured to: execute a first operating system (OS) configured to perform first operations;

execute a second OS configured to perform second operations, the second OS configured to provide higher security than the first OS; only read the first code from the first storage at a first time and store the read first code in the secured area of the second storage as second code during the execution of the second OS; read the first code from the first storage at a second time; compare the first code read at the second time with the second code retrieved from the secured area of the second storage; and stop operation of the electronic device based on a determination that the first code read at the second time does not match the second code.

The processor may be further configured to output a notification message indicating that the first code read at the second time does not match the second code.

The first storage may be pre-stored with the first code during manufacturing of the electronic apparatus.

The processor may be further configured to periodically compare the first code read at the second time with the second code retrieved from the secured area of the second storage.

According to another aspect of the disclosure, there is provided an electronic apparatus comprising: a storage having secured area pre-stored with a first code during manufacturing of the electronic apparatus; a processor configured to: execute a first operating system (OS) configured to perform first operations; execute a second OS configured to perform second operations, the second OS configured to provide higher security than the first OS; receive a request for reproducing a content; retrieve the first code from the secured area of the storage during the execution of the second OS; retrieve a second code associated with the content; compare the first code with the second code associated with the content; and reproduce the content based on a result of the comparison between the first code and the second code.

The second code associated with the content may be retrieved during the execution of the first OS.

BRIEF DESCRIPTION OF THE DRAWINGS

The above and/or the aspects will become apparent and more readily appreciated from the following description of embodiments, taken in conjunction with the accompanying drawings, in which.

DETAILED DESCRIPTION OF EMBODIMENTS

Figure 1:
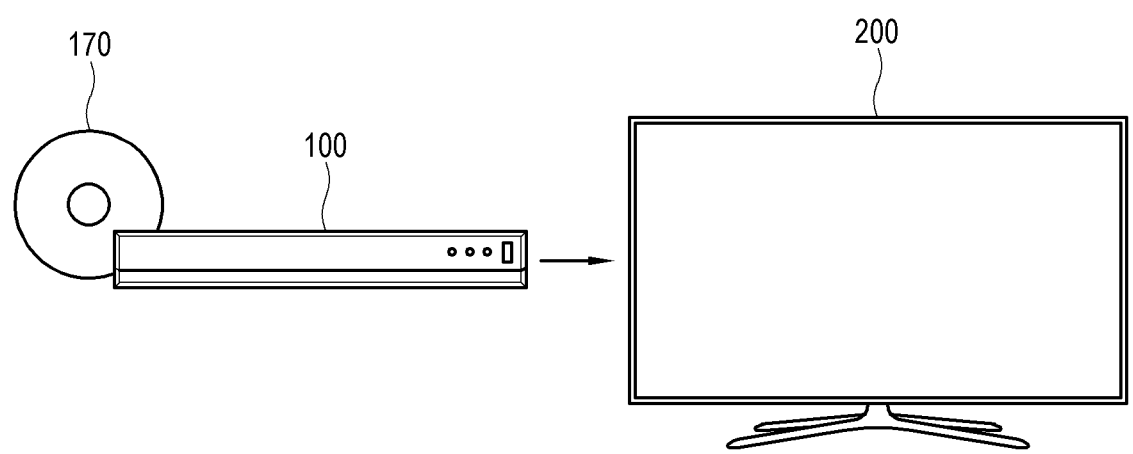
FIG. 1 is a drawing illustrating an example of a system that includes an electronic apparatus and an external apparatus according to an embodiment of the disclosure.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the disclosure and the key configurations and functions. In the following descriptions, details about publicly known functions or features will be omitted if it is identified that they cloud the gist of the disclosure.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

One or more embodiments is to provide an electronic apparatus, which prevents its own inherent code from being illegally changed by hacking or the like method of arbitrarily changing the inherent code in the apparatus or prevents a copyright of content from being infringed, a method of controlling the same, and a recording medium thereof.

One or more embodiments is to provide an electronic apparatus, which allows a user to be aware of illegal change in its own inherent code and thus raises the awareness of a copyright on content, a method of controlling the same, and a recording medium thereof.

One or more embodiments is to provide an electronic apparatus, which is suitable for mass production because security for its inherent code is enhanced by software operation after manufactured, a method of controlling the same, and a recording medium thereof.

FIG. 1 illustrates an example of a system that includes an electronic apparatus and an external apparatus according to an embodiment of the disclosure;

As shown in FIG. 1, an electronic apparatus 100 according to an embodiment of the disclosure operates as a content provider, i.e. a source apparatus for providing image content (hereinafter, referred to as 'content') to at least one external apparatus 200. The electronic apparatus 100 may be provided as a player for reproducing content in the external apparatus 200.

The external apparatus 200 operates as a sync apparatus. The external apparatus 200 is connected to the electronic apparatus 100 by a wire or wirelessly, and processes data output from the electronic apparatus 100, thereby displaying an image based on the processed data. Further, the external apparatus 200 may perform a signal process so that a moving image, a still image, an application, an on-screen display (OSD), a user interface (UI) for controlling various operations, etc. based on a signal/data stored in an internal or external storage medium can be displayed on a screen.

The electronic apparatus 100 and the external apparatus 200 may be connected by an interface based on various wired/wireless standards.

The electronic apparatus 100 includes all the apparatuses for reproducing or relaying content, such as an optical disc player; an audio/video (AV) receiver; a set-top box; a streaming apparatus; etc. The electronic apparatus 100 actualized by the streaming apparatus is provided with a receiver to receive content of a real-time streaming file from the outside, and the receiver is included in a communicator 120 (see FIG. 4, to be described later).

According to an embodiment, the electronic apparatus 100 actualized by the optical disc reproducer reads content from a Blu-ray disc (BD), an ultra-high definition (UHD) BD, a digital versatile disc (DVD), or the like optical disc 170, i.e. a storage medium where the content is recorded. There are no limits to the kind of content to be recorded in the optical disc 170. For example, there is a UHD BD in which high dynamic range (HDR) content is stored. The electronic apparatus 100 is provided with a disc loader (see '171' in FIG. 8) that rotates the optical disc to read data stored therein for reproduction of content. Thus, digital content is read from the rotating disc 170, i.e. The UHD BD, the BD, the DVD, etc. by a laser.

The electronic apparatus 100 according to an embodiment of the disclosure is assigned with a predetermined code (hereinafter, referred to as an inherent code, an identification code or a product code). There are no limits to the kind or type of code given to the electronic apparatus 100 according to the disclosure. The inherent code may be assigned by a manufacturer when the apparatus is manufactured, its value may be stored in the electronic apparatus 100.

The electronic apparatus 100 may be assigned with the inherent code for management, security and the like, and such an assigned inherent code may be utilized as an identification or authentication means to perform operations of the electronic apparatus 100, for example, connection with the outside, execution of a predetermined application, etc.

According to an embodiment, the inherent code assigned to the electronic apparatus 100 includes a region code. Alternatively, the inherent code assigned to the electronic apparatus 100 may include another code different from the region code.

According to an embodiment, the electronic apparatus 100 actualized as a content reproducer is factory-set to store the region code showing a regional range in which content is reproducible.

According to an embodiment, the region code may be stored in such a manner that a configuration flag is set in firmware installed in the electronic apparatus 100.

The optical disc 170 is configured to record, i.e. store content along with region code information about regions where the content is reproducible.

Figure 2:
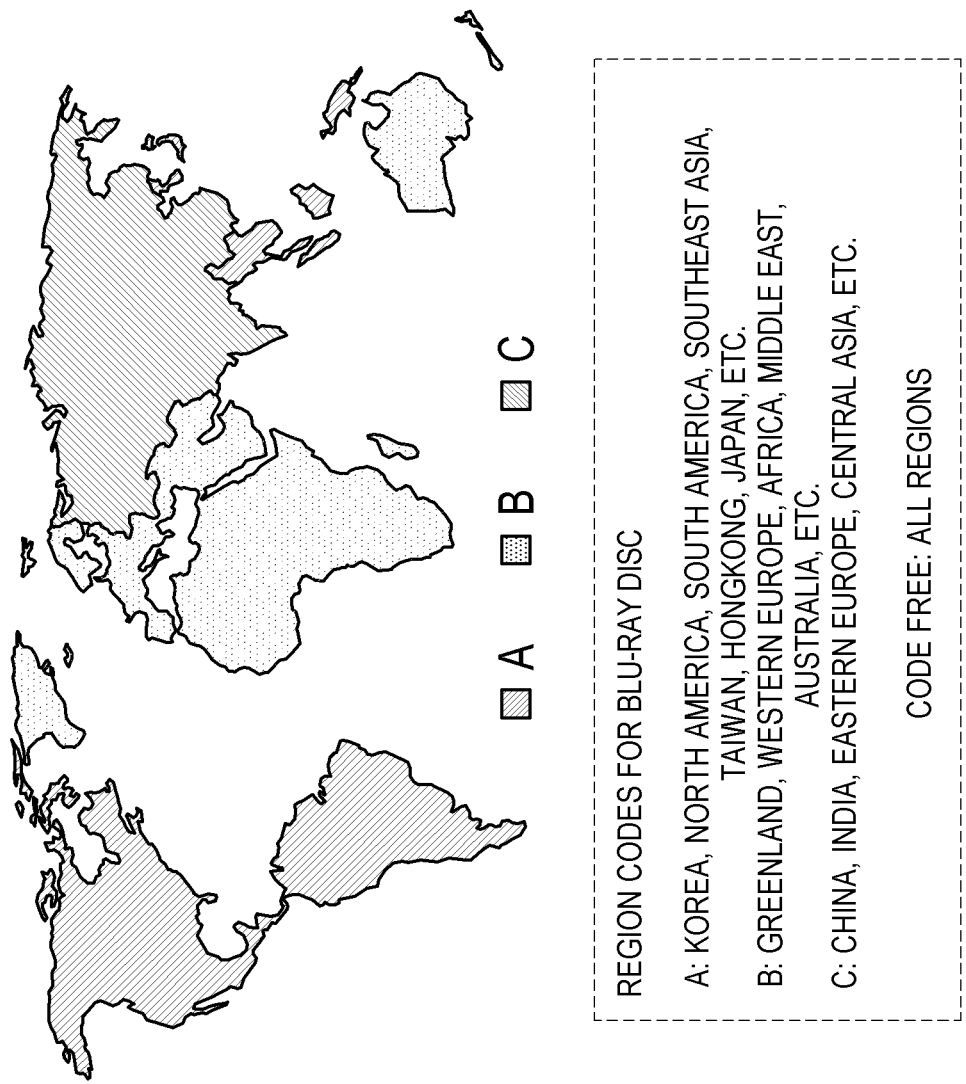
FIGS. 2 and 3 are examples of region codes recorded in a disc.
Figure 3:
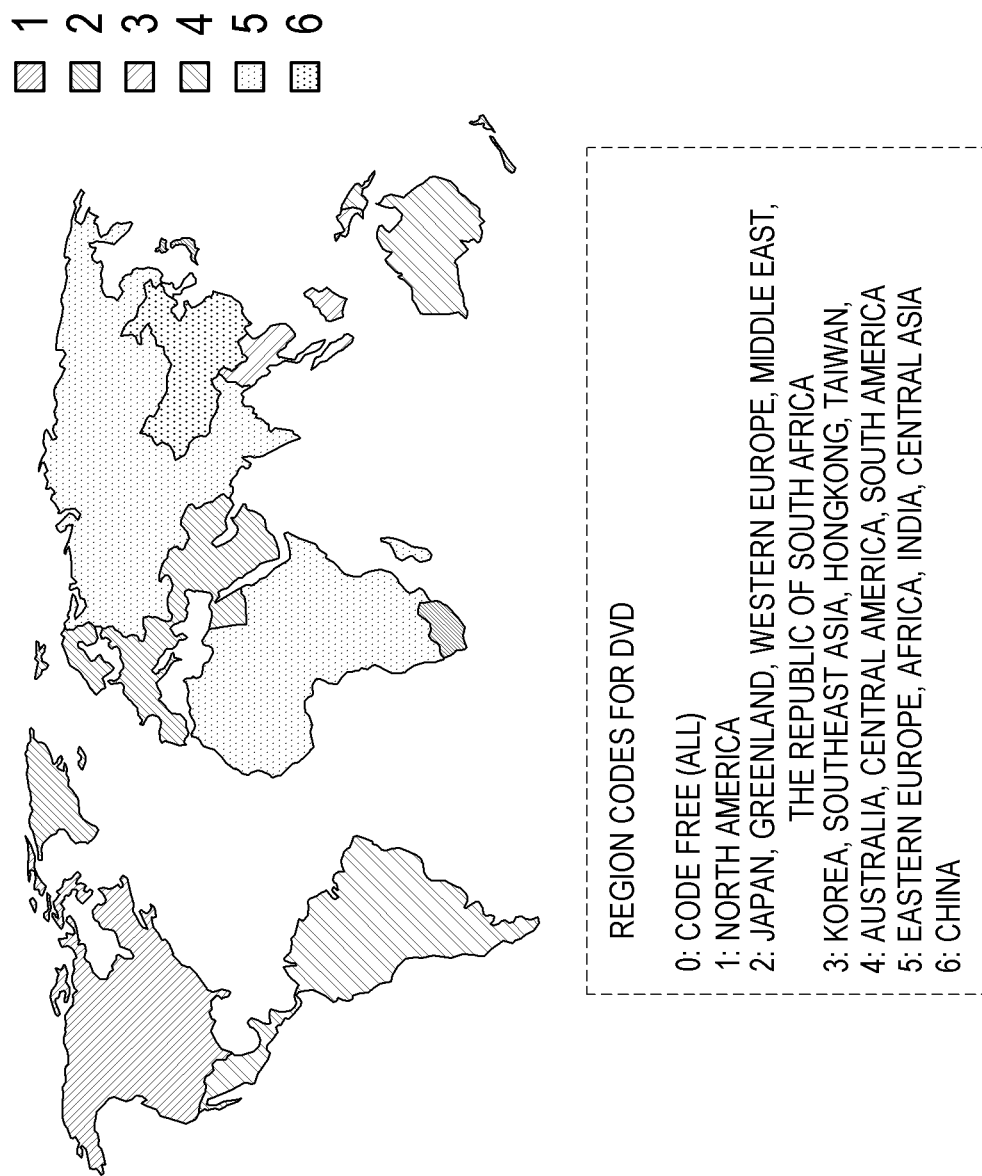

FIGS. 2 and 3 are examples of region codes recorded in a disc.

As shown in FIG. 2, a BD may be assigned with one region code among 'A', 'B' and 'C' (or, 'A/1', 'B/1' and 'C/1'). Content stored in the BD assigned with a specific region code is reproducible by only a player that has the same region code.

As shown in FIG. 3, a DVD may be on sale as assigned with one region code among '1' to '6', and content stored in the DVD assigned with a specific region code is reproducible by only a player that has the same region code.

Below, it will be defined that a region code set to the electronic apparatus 100 is a first region code, and a region code recorded in a disc 170 is a second region code.

Meanwhile, the inherent code assigned to the electronic apparatus 100 according to the disclosure is not limited to the region code. According to an alternative embodiment of the disclosure, the electronic apparatus 100 may be assigned (or set or stored) with a first code as the inherent code for management, security, etc. of the apparatus, and a second code may be obtained from the outside as a target for comparison with the first code. In the alternative embodiment, there are no limits to the method of obtaining the second code from the outside. For example, the second code may be obtained by a user's input using a user input receiver 140 such as a remote controller, or may be obtained as involved in a signal transmitted to a processor 180 through at least one among a communicator 160, a connector 110 and an internal interface.

The electronic apparatus 100 according to another embodiment compares the first code assigned to the electronic apparatus 100 and the second code obtained from the outside, and is then controlled to perform a certain operation such as content reproduction, external connection, etc. when both codes match.

In other words, it will be understood in the following embodiments that the first code includes the first region code and the second code includes the second region code.

An external apparatus 200 refers to a display apparatus with a display (see '290' in FIG. 5) for displaying an image, and includes various apparatuses such as a television (TV), a mobile device, a laptop or desktop computer system (or a personal computer (PC) or a monitor connected to the computer), and so on.

According to an embodiment, as shown in FIG. 1, the external apparatus 200 includes a display apparatus such as a television (TV) for processing a broadcast image based on at least one among a broadcast signal, broadcast information or broadcast data received from a transmitter of a broadcasting station. For example, the external apparatus 200 may wirelessly receive a radio frequency (RF) signal transmitted from a broadcasting station, i.e. a broadcast signal. To this end, the external apparatus 200 may include an antenna to receive the broadcast signal, and a tuner to be tuned to each individual channel for the broadcast signal.

The broadcast signal may be received in the external apparatus 200 through a ground wave, a cable, a satellite, etc., and a signal supplying source in the disclosure is not limited to the electronic apparatus 100 or the broadcasting station. In other words, any apparatus or station capable of transmitting and receiving data may be included in the signal supplying source of the disclosure.

A signal received in the external apparatus 200 may be configured by various methods corresponding to apparatus types, and for example, an image signal may be received by wires based on a high definition multimedia interface (HDMI), composite video, component video, super video, syndicat des constructeurs d'appareils radiorécepteurs et téléviseurs (SCART), and the like standards.

Further, the external apparatus 200 may receive image content from various apparatuses such as the electronic apparatus 100 and a server (not shown) through wireless communication. According to an embodiment of the disclosure, the external apparatus 200 may perform at least one between wireless communication using an access point (AP) or wireless communication for direct connection with other devices without the AP. For example, the external apparatus 200 may receive content from the electronic apparatus 100 through wireless communication such as Wi-Fi or Wi-Fi direct.

According to an embodiment, the display apparatus provided as the external apparatus 200 may operate as a smart TV or Internet protocol (IP) TV. The smart TV refers to a TV that is capable of receiving and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, map, music, movie, game, electronic book, etc.

According to an embodiment, the external apparatus 200 may include a mobile apparatus capable of wirelessly communicating with the electronic apparatus 100. The mobile apparatus is actualized by various mobile digital apparatuses, and may for example include not only a smart phone, a tablet computer or the like smart pad, and a personal digital assistant (PDA) but also a head mounted display (HMD) device, a smart watch and the like wearable device that can be worn on a user's body. The HMD device provides an environment for virtual reality (VR), mixed reality (MR) where a virtual object is mixed to the real world, or augmented reality (AR) to a user through its display.

According to the disclosure, the kind, number or connection method of the external apparatus 200 in the disclosure is not limited to those shown in FIG. 1. Alternatively, only the mobile apparatus, both the display apparatus and the mobile apparatus, two or more display apparatuses, or two or more mobile apparatuses may be provided as the external apparatus 200. Alternatively, the display apparatus may receive content from the electronic apparatus 100 through wired communication, or the mobile apparatus may be connected to the electronic apparatus 100 through a wired interface and receive the content.

Below, elements of an electronic apparatus according to an embodiment of the disclosure and an external apparatus connected to the electronic apparatus by a wire will be described with reference to the accompanying drawings.

Figure 4:
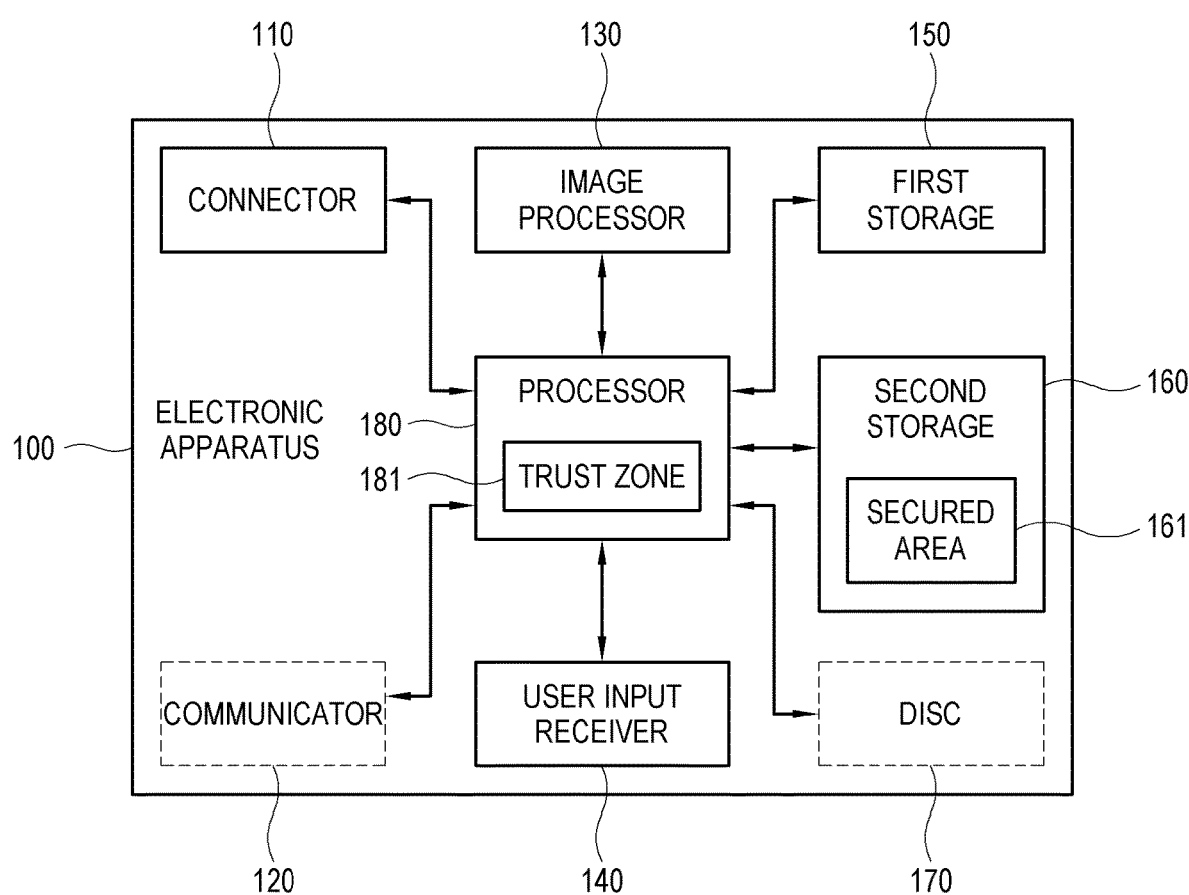
FIG. 4 is a block diagram showing a configuration of an electronic apparatus according to an embodiment of the disclosure.

FIG. 4 is a block diagram showing a configuration of an electronic apparatus according to an embodiment of the disclosure.

As shown in FIG. 4, the electronic apparatus 100 according to an embodiment of the disclosure includes a connector 110, a communicator 120, an image processor 130, a user input receiver 140, a first storage 150, a second storage 160, and a processor 180. When the electronic apparatus 100 is an optical disc reproducer, a disc 170 may be further included as a storage medium recorded with content as shown in FIG. 4.

The connector 110 is for wired connection between the electronic apparatus 100 and the external apparatus 200. The electronic apparatus 100 is connected to the connector 110 by a wire and transmits an image signal to the external apparatus 200 through the connector 110.

The connector 110 may be actualized by a communication circuitry including a data input/output interface where ports and communication modules (e.g. an S/W module, a chip, etc.) corresponding to various kinds of communication protocols are combined. The connector 110 is basically configured to transmit a signal to the external apparatus 200, but may be interactively configured to transmit and receive a signal.

According to an embodiment, the connector 110 and the external apparatus 200 are connected by an HDMI cable. However, a connection method is not limited to the HDMI.

According to an embodiment, the external apparatus 200 connected to the electronic apparatus 100 by a wire through the connector 110 is the display apparatus such as a TV. However, the disclosure is not limited to the display apparatus. For example, alternatively, the electronic apparatus 100 may be connected to the mobile apparatus by a wire though the connector 110.

The communicator 120 performs wireless communication with at least one external apparatus 200. The electronic apparatus 100 may wirelessly transmit an image signal to the external apparatus 200 through the communicator 120.

The communicator 120 may be actualized by a communication circuitry including wireless communication modules (e.g. an S/W module, a chip, etc.) corresponding to various kinds of communication protocols.

According to an embodiment, the communicator 120 includes a wireless local area network (WLAN) unit. The WLAN unit may be wirelessly connected to the external apparatus 200 through an AP under control of the processor 180. The WLAN unit includes a Wi-Fi communication module.

According to an embodiment, the communicator 120 includes a local area communication module to support direct wireless communication between the electronic apparatus 100 and the external apparatus 200 without the AP. The local area communication module may be based on at least one of Wi-Fi Direct, Bluetooth, Bluetooth low energy, radio frequency (RF) communication, infrared data association (IrDA), ZigBee), ultrawideband (UWB), and near field communication (NFC). When the electronic apparatus 100 performs direct communication with the external apparatus 200, the storage 150 may be configured to store identification information (e.g. a media access control (MAC) address or an IP address) about the external apparatus 200 with which the communication is performed.

According to an embodiment of the disclosure, the communicator 120 in the electronic apparatus 100 is configured to perform wireless communication with the external apparatus 200 by at least one of the WLAN unit and the local area communication module according to performances.

Alternatively, the electronic apparatus 100 may further include a wired communication module such as Ethernet, etc. Alternatively, the communicator 120 may further include a communication module based on various communication methods such as long-term evolution (LTE) or the like mobile communication, electromagnetic (EM) communication including a magnetic field, visible light communication, acoustic wave communication, etc.

According to an embodiment, the electronic apparatus 100 may receive an image signal corresponding to content from an external server through the communicator 120 by a streaming method in real time. For example, the electronic apparatus 100 may receive an image signal based on Netflix, YouTube or the like service by the streaming method.

The image processor 130 performs various video/audio processes previously set to an image signal output to the external apparatus 200 through the connector 110 or the communicator 120. According to the disclosure, there are no limits to the kind of image content to be processed by the image processor 130. For example, the image processor 130 may be provided to process an image signal of HDR content or SDR content.

According to an embodiment, the image processor 130 includes a decoder, a scaler, an encoder, and the like elements.

Further, there are no limits to the kind of image processing processes performed in the image processor 130 of the disclosure. For example, the image processor 130 may perform at least one among various processes such as a resolution conversion, color conversion, color space conversion, brightness change, noise reduction, detail enhancement, etc. and may be configured to additionally include elements related to these processes.

The image processor 130 may be actualized by a group of individual elements for independently performing such processes, or may be actualized as included in a main system-on-chip (SoC) where many functions are integrated. The main SoC may include at least one micro-processor or central processing unit (CPU) as an example of the processor 180 (to be described later).

According to an embodiment, the image processor 130 may be actualized by a video board where various chipsets, a memory, electronic parts, wiring lines, and the like circuit components for performing such processes are mounted on to a printed circuit board (PCB). In this case, the image processor 130 and the processor 180 of the electronic apparatus 100 may be provided in a single video board. Of course, this is merely an example, and alternatively the image processor 130 and the processor 180 may be arranged in a plurality of printed circuit boards connectable with each other.

The user input receiver 140 transmits various preset control commands or unrestricted information based on a user's input to the processor 180. The user input receiver 140 includes a keypad (or input panel) including a power key, a menu key, and the like buttons provided in a main body of the electronic apparatus 100.

According to an embodiment, the user input receiver 140 includes an input device that generates a preset command/data/information/signal for remotely controlling the electronic apparatus 100 and transmits it to the electronic apparatus 100. The input device is provided separately from the main body of the electronic apparatus 100 like a remote controller and receives a user's input. The remote controller may include a touch sensor for detecting a user's touch input and/or a motion sensor for detecting its own motion caused by a user. The input device includes a terminal such as a smart phone where a remote controller application is installed, and in this case a user's touch input can be made through a touch screen. According to an embodiment, the input device may be actualized by a universal remote controller capable of controlling both the electronic apparatus 100 and the external apparatus 200.

The input device can perform wireless communication with the main body of the electronic apparatus 100, and the wireless communication includes Bluetooth, infrared communication, RF communication, WLAN, Wi-Fi direct, etc.

the user input receiver 140 may further include a sound receiver for receiving a voice/sound uttered by a user. The sound receiver may be actualized by a microphone for receiving a sound signal, and may be installed in the main body of the electronic apparatus 100, the remote controller, or the like.

According to an embodiment, the first storage 150 and the second storage 160 may be configured to store various pieces of data of the electronic apparatus 100. The first storage 150 and the second storage 160 may be actualized by a nonvolatile memory (or a writable read only memory (ROM) which can retain data even though the electronic apparatus 100 is powered off, and mirror changes.

Each of the first storage 150 and the second storage 160 may be provided as one among a flash memory, electrically programmable ROM (EPROM) or electrically erasable and programmable ROM (EEPROM).

In the electronic apparatus 100 according to an embodiment of the disclosure, the first storage 150 and the second storage 160 are differently set in an accessible operating system (OS). Accordingly, although the code in the first storage (EPROM) is changed by hacking or the like, it does not have any effect on identification about whether to do an operation.

Figure 5:
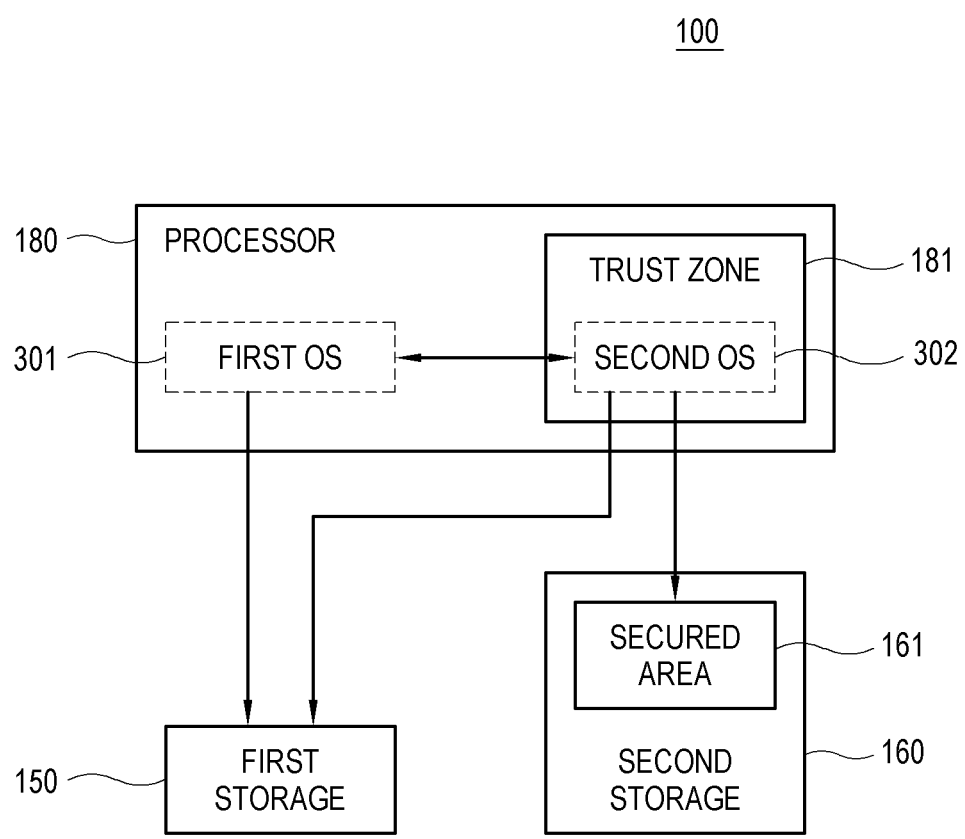
FIG. 5 is a drawing illustrating a relationship between an operating system (OS) and a storage in an electronic apparatus according to an embodiment of the disclosure.

FIG. 5 is a drawing illustrating a relationship between an OS and a storage in an electronic apparatus according to an embodiment of the disclosure.

In the electronic apparatus 100 according to the embodiment shown in FIG. 5, a first OS 301 and a second OS 302 are executable by the processor 180.

The first OS 301 is defined as an OS loaded in the electronic apparatus 100 and performing general operations. The second OS 302 is different from the first OS 301, and defined as a secured or trusted OS that provides more enhanced security than the first OS 301.

According to an embodiment, the second OS 302 refers to a separate OS that operates at a high level independently of the first OS 301 and may provide only essential functions to protect important information under a running condition of the second OS 302. There are no limits to the kind of OS to be applied in this disclosure. For example, the Tizen and a separate OS operating on the Tizen may be employed as the first OS and the second OS, respectively.

As shown in FIG. 5, the second OS 302 that operates in a trust zone 181 (hereinafter, referred to as a 'secure world') as a kind of a security area of the processor 180 is distinguished from the first OS 301 that operates in a normal area (hereinafter, also referred to as a 'normal world') of the processor 180. Thus, the security OS itself is not exposed to external attack but securely protected.

As shown in FIG. 5, the first storage 150 allows an access of the first OS 301 and the second OS 302.

According to an embodiment, the first storage 150 may be actualized by the EPROM, but not limited thereto. Alternatively, the first storage 150 according to the disclosure may be actualized by a flash memory.

The second storage 160 allows an access of the second OS 302 with regard to at least a partial area, but restricts the access of the first OS 301. Specifically, as shown in FIGS. 4 and 5, the second storage 160 includes a secured area (or secured storage) 161 as an auxiliary area, in which the access of the first OS 301 is restricted, in addition to a main area (or normal area). According to an embodiment, the main area may be an area in which various programs including the OS are stored.

According to an embodiment, the processor 180 performs control to have an access to the secured area 161 of the second storage 160 through a specific application programming interface (API) of the second OS 302 so that data can be read or written. Therefore, an access using an unallowed channel to the secured area 161 is prevented.

The secured area 161 has an address which does not overlap with an address of another area (i.e. The main area/normal area, and the first OS 301 (normal world) and the second OS 302 (secure world) see different address spaces. Therefore, not only the first OS 301 is not allowed to have an access to the secured area 161, but also resources are prevented from collision due to an overlap of an access between the first OS 301 and the second OS 302

FIGS. 4 and 5 illustrate the embodiment where a part of the second storage 160 is the secured area 161 by way of example, but the disclosure is not limited to this embodiment. Alternatively, according to another embodiment, the entire area of the second storage 160 may be set as the secured area 161.

According to an embodiment, the second storage 160 may be actualized by a flash memory, but not limited thereto. Alternatively, according to another embodiment of the disclosure, the first storage 150 is an EPROM. In other words, the first storage 150 and the second storage 160 are not distinguished according to the kind of used memory. For example, according to another embodiment, each of the first storage 150 and the second storage 160 is an EPROM.

Further, the first storage 150 and the second storage 160 are not distinguished according to physical implementation. For example, a predetermined memory device such as a flash memory may be logically divided to correspond to each of the first and the second storage, and at least a partial area of the divided second storage may be set as the secured area.

However, the disclosure based on the embodiment of FIGS. 4 and 5 shows an example that the second storage 160 is actualized by a flash memory as a main storage, a main area of which is stored with programs for the electronic apparatus 100 and a part of which is partially set as the secured area 161, and the first storage 150 is actualized by an EPROM as an auxiliary storage added to the electronic apparatus 100 to store the inherent code.

According to an embodiment, data in the secured area 161 of the second storage 160 is fully encrypted and stored. In other words, when the second OS 302 is running, the processor 180 performs control to transmit and receive data related to the secured area 161 under a condition that the data is encrypted. Therefore, security is ensured even though the data of the secured area 161 is illegally leaked to the outside, because the content of the data is not identified. Here, there are no limits to a method of encrypting the data. For example, an algorithm such as Rivest-Shamir-Adleman (RSA), and advanced encryption standard (AES) for generating a seed with random digits, i.e. random numbers may be used to encrypt the data.

In this disclosure, a term 'storage' is defined to involve not only the first storage 150 and the second storage 160, but also a volatile memory such as a dynamic random-access memory (DRAM) or static RAM (SRAM), of which reading or writing speed is faster than a nonvolatile memory, a cache memory provided inside the processor 180, a memory card (e.g. a micro SD card, a memory stick, etc.) mountable to the electronic apparatus 100 through the connector 110, and the disc 170 stored with content.

Data stored in the storage may for example include not only the OS (i.e. The first OS 301 and the second OS 302) for driving the electronic apparatus 100 but also various software, programs, applications, image data, appended data, etc. executable on the OS. According to an embodiment, programs, applications and the like data based on security-rich requirements are stored in the secured area 161 of the second storage 160.

The electronic apparatus 100 according to an embodiment of the disclosure is factory-set to store the first code in the first storage 150. Here, the first code may be the first region code showing a regional range of content reproducible by the electronic apparatus 100.

The first code stored in the first storage 150 is copied to the secured area 161 of under control of the processor 180 in response to occurrence of a predetermined event. That is, the code is stored in the second storage 160 by the operation of the software after factory shipments, and therefore an effect on improving security is expected without changing the existing production facilities. In addition, an external access to the first code stored in the secured area is restricted to thereby keep security.

There are no limits to the kind of events for making the first code be copied. For example, the events may include the first bootup of the electronic apparatus 100.

The processor 180 performs control to operate general elements of the electronic apparatus 100. The processor 180 may include a control program (or instruction) to perform such a control operation. The processor 180 includes at least one universal processor to load at least a part of the control program installed in the nonvolatile memory into the volatile memory and execute the loaded control program. For example, the processor 180 may be actualized by a CPU, an application processor (AP), or a microprocessor.

The processor 180 may include a single core, a dual core, a triple core, a quad core, and the like multiple core.

According to an embodiment, the core of the processor 180 is divided into two virtual cores, of which one is executed on the normal world and the other one is executed on the secure world. Therefore, during the operation of the second OS 302, for example, while the data is read or written, it is possible to prevent flow and the like of data from being exposed by the first OS 301, thereby providing a trusted execution environment (TEE).

In the secure world, programs, which have to be secure against not only the second OS 302 but also a rootkit and are required to have high reliability, may be executed. The normal world and the secure world may be switched over to each other through monitor mode software provided in the secure world. Each individual virtual core accesses its own virtual memory management unit (MMU) so that switching between divided normal and secure page tables can be maintained. In the cache memory, additional tag bits are present to divide data cached by the secure world core from data cached by the normal world core, and therefore an access to the cached security data is denied to a normal world master.

According to an embodiment, when the electronic apparatus 100 is booted up, the second OS 302 is executed in the secure world to set authority to have an access to the trust zone 181, and then the first OS 301 is executed in the normal world. In other words, control is made not to switch over to the normal world until the secure world is completely initialized, thereby securely protecting the codes of the secure world.

The processor 180 is controlled to selectively operate in either of the normal world or the secure world.

The processor 180 may include a plurality of processors, for example, a main processor and a sub processor that operates in a sleep mode (during which only standby power is supplied without operations of a content providing apparatus). Further, the processor, the ROM, and the RAM may be connected to one another through an internal bus, and the ROM and the RAM are involved in the storage.

In the disclosure, the processor 180 may be actualized as included in the main SoC mounted to the PCB internally provided in the electronic apparatus 100. Alternatively, the main SoC may further include the image processor 130.

The control program may include a program(s) achieved by at least one of a basic input/output system (BIOS), a device driver, an OS, a firmware, a platform, or an application. According to an exemplary embodiment, the application may be previously installed or stored in the electronic apparatus 100 when the electronic apparatus 100 is manufactured, or may be installed in the electronic apparatus 100 on the basis of application data received from the outside when it is required in the future. The application data may for example be downloaded from an external server such as an application market to the electronic apparatus 100. Such an external server is merely an example of the computer program product according to the disclosure, but not limited thereto.

According to an embodiment, the foregoing operations of the processor 180 may be actualized by a computer program stored in the computer program product (not shown) provided separately from the electronic apparatus 100. In this case, the computer program product includes a memory in which an instruction corresponding to a computer program is stored, and a processor. The instruction may be issued to read the first code from the first storage 150 when the instruction is executed by the processor, store the read first code in the secured area 161 of the second storage 160, and process an image signal according to whether the first code stored in the secured area 161 matches the second code of the content to be reproduced.

Accordingly, the electronic apparatus 100 downloads and executes the computer program stored in a separate computer program product and performs the operations of the processor 180.

Figure 6:
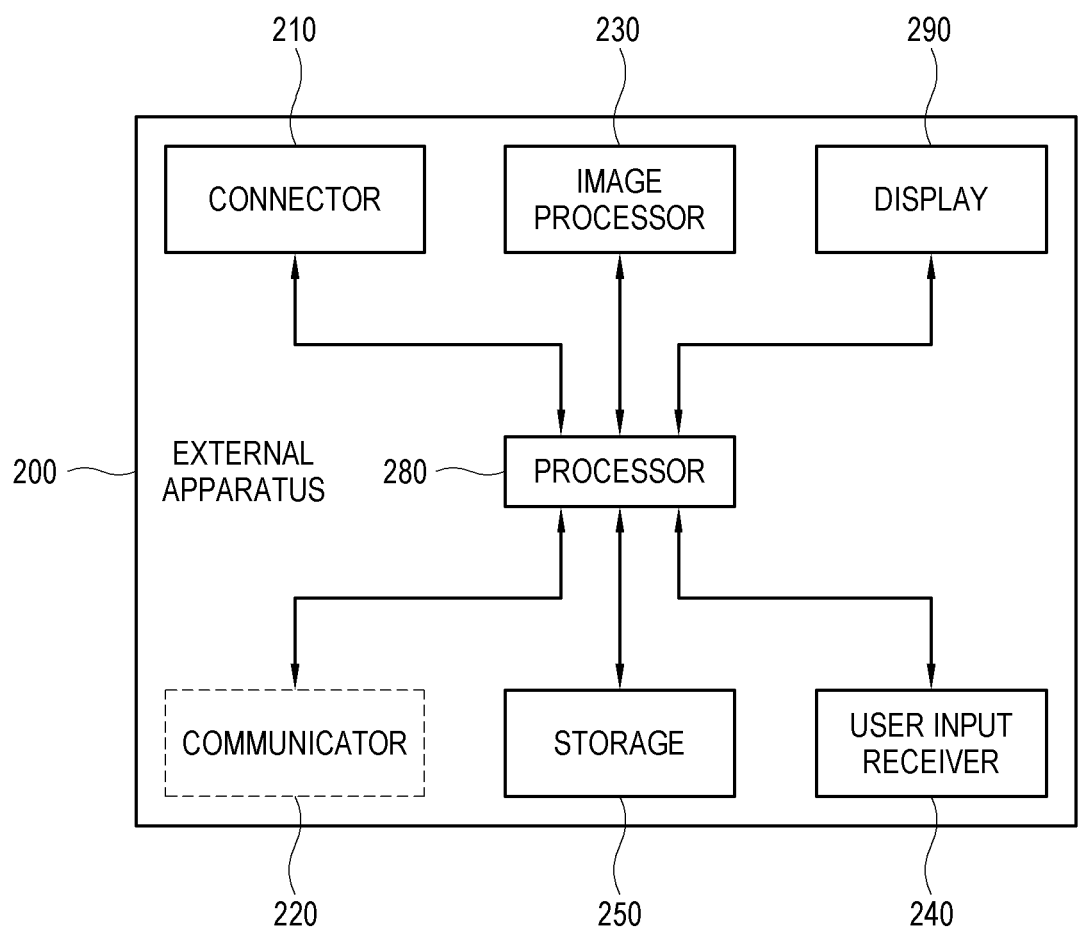
FIG. 6 is a block diagram showing a configuration of an external apparatus according to an embodiment of the disclosure.

FIG. 6 is a block diagram showing a configuration of an external apparatus according to an embodiment of the disclosure.

The external apparatus 200, which includes a TV or the like display apparatus as shown in FIG. 1, receives an image signal provided as described above from the electronic apparatus 100 and processes the received image signal to be displayed on the display 290. However, the disclosure is not limited to this embodiment, and the external apparatus 200 may include a mobile device such as a smart phone or a wearable device such as an HMD device, which receives an image signal from the electronic apparatus 100. The configuration shown in FIG. 6 may be applicable to the external apparatus 200 actualized in various forms, but may include or exclude some elements according to the characteristics of the apparatus, or a specific element may be differently actualized.

There are no limits to the display 290 provided in the external apparatus 200. For example, the display 290 may be actualized by various display types such as liquid crystal, plasma, a light-emitting diode, an organic light-emitting diode, a surface-conduction electron-emitter, a carbon nanotube, nano-crystal, etc. The display may further include an additional element (e.g. a driver) according to the types.

According to an embodiment, the display 290 is actualized by a touch screen for detecting a user's touch input. The touch input may include various gestures or motion inputs such as a single touch, multi touches, a tap, a click, dragging in a certain direction, a flick, etc.

The touch screen includes a touch pad placed on the top of a panel where an image is displayed, and a user interface (UI, hereinafter also referred to as a graphic user interface (GUI)) selectable by a user is displayed on the touch screen. The touch pad and the UI are included in the user input receiver 240. The UI may include menu items for the external apparatus 200 or the electronic apparatus 100.

According to an embodiment, the UI displayed on the display 290 may display a warning message about a predetermined operation of the apparatus, e.g. reproduction of content, or a warning message about illegal change in the inherent code of the apparatus when the codes do not match. Concrete examples of the warning message to be displayed will be described in more detail with reference to FIGS. 10 and 13.

The external apparatus 200 according to an embodiment of the disclosure includes a connector 210, a communicator 220, an image processor 230, the user input receiver 240, a storage 250, and a processor 280 as shown in FIG. 6 in addition to the display 290. However, all these elements are not essential, and thus the external apparatus 200 may be actualized without at least some among the foregoing elements. Further, the external apparatus 200 may further include another element, for example, a tuner to be tuned to a channel for a broadcast signal, in addition to the foregoing elements.

As described above, the elements provided in the external apparatus 200 are actualized corresponding to those defined by the same terms in the electronic apparatus 100. Therefore, the elements having the same functions as those of the electronic apparatus 100 will be given the same names as those of the electronic apparatus 100, and detailed descriptions thereof will be omitted to avoid repetitive descriptions.

Figure 7:
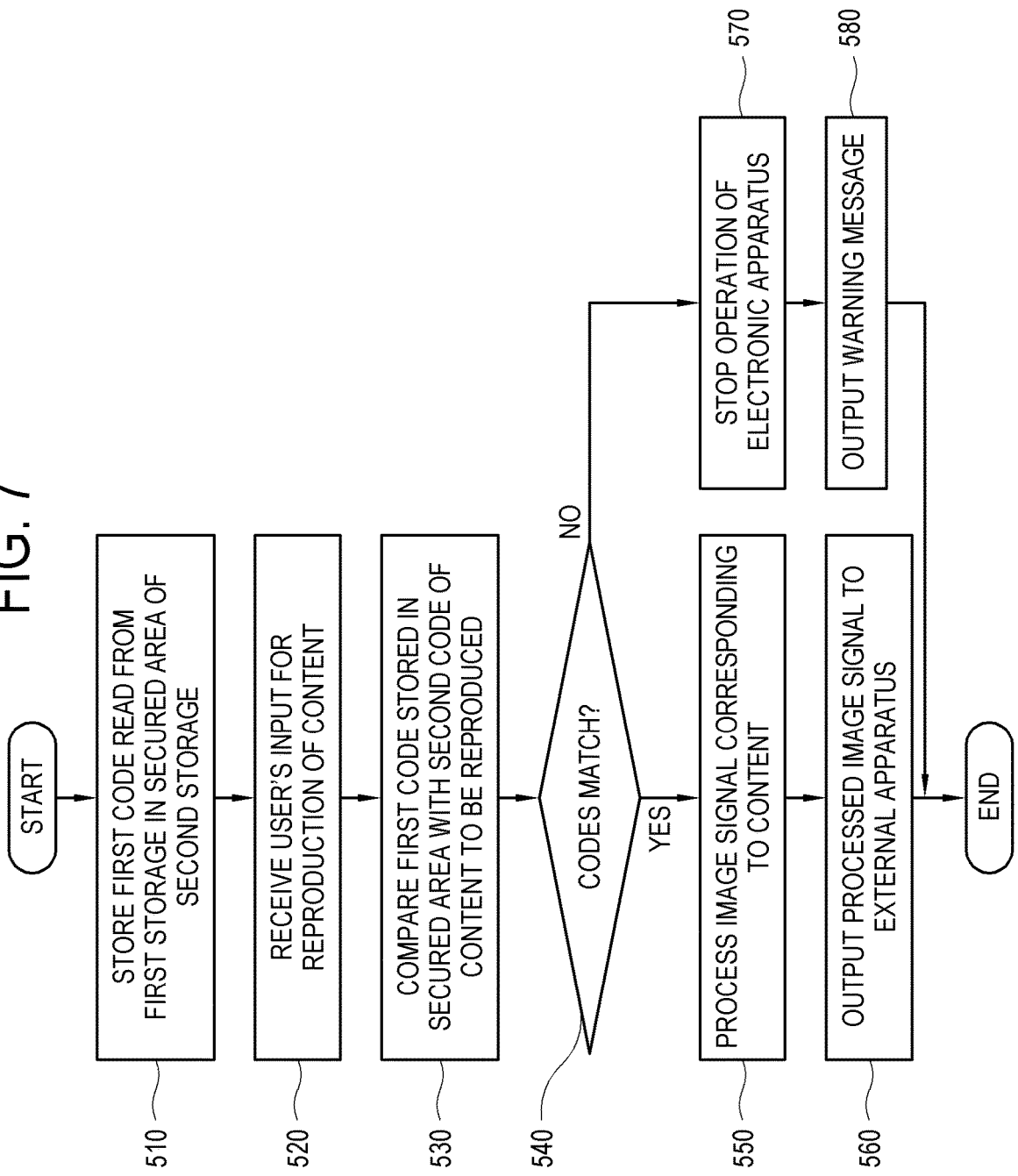
FIG. 7 is a flowchart controlling an electronic apparatus according to a first embodiment of the disclosure.
Figure 8:
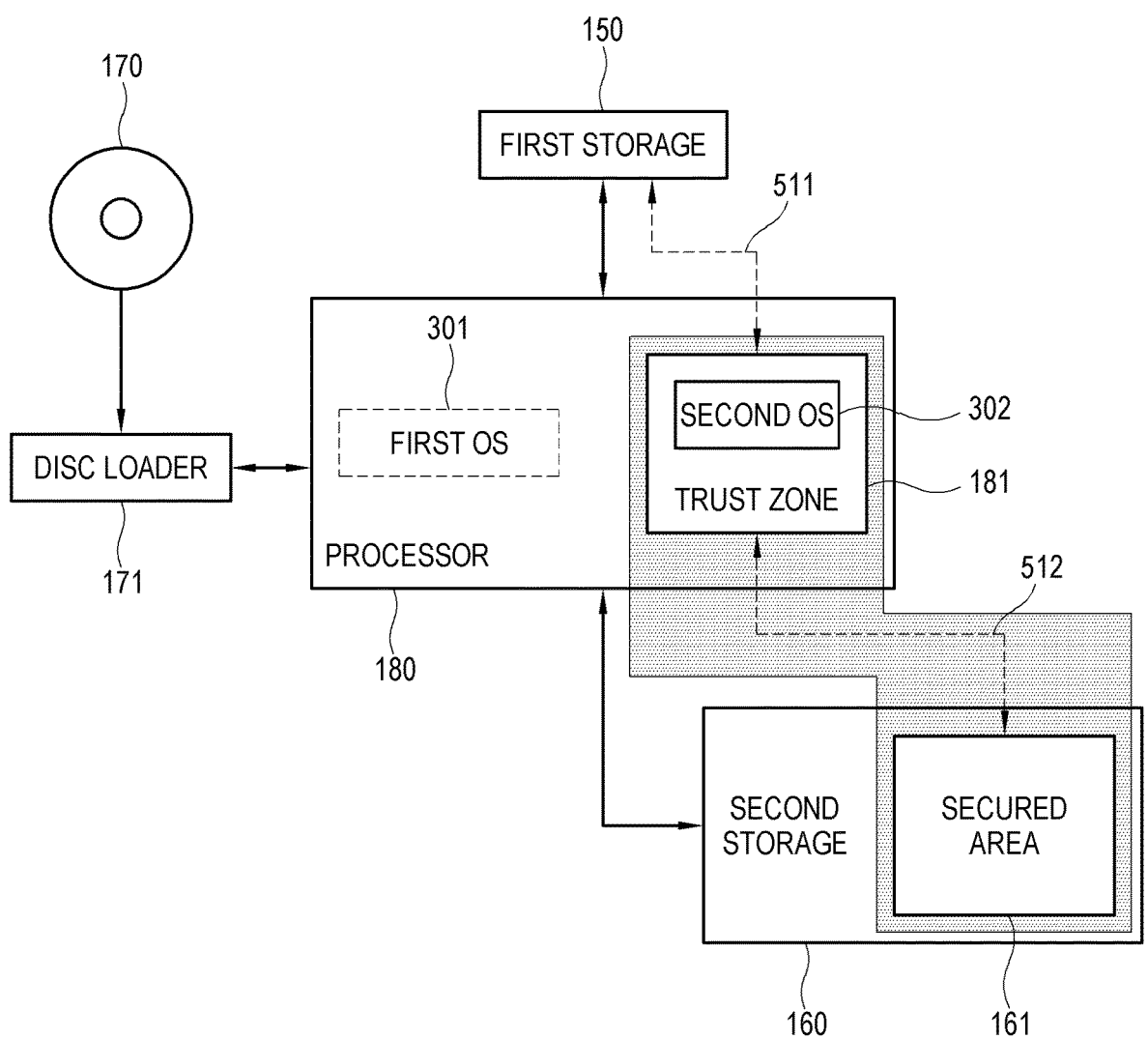
FIGS. 8 to 10 are drawings for explaining detailed operations of a control method in the electronic apparatus according to the first embodiment of FIG. 7.
Figure 9:
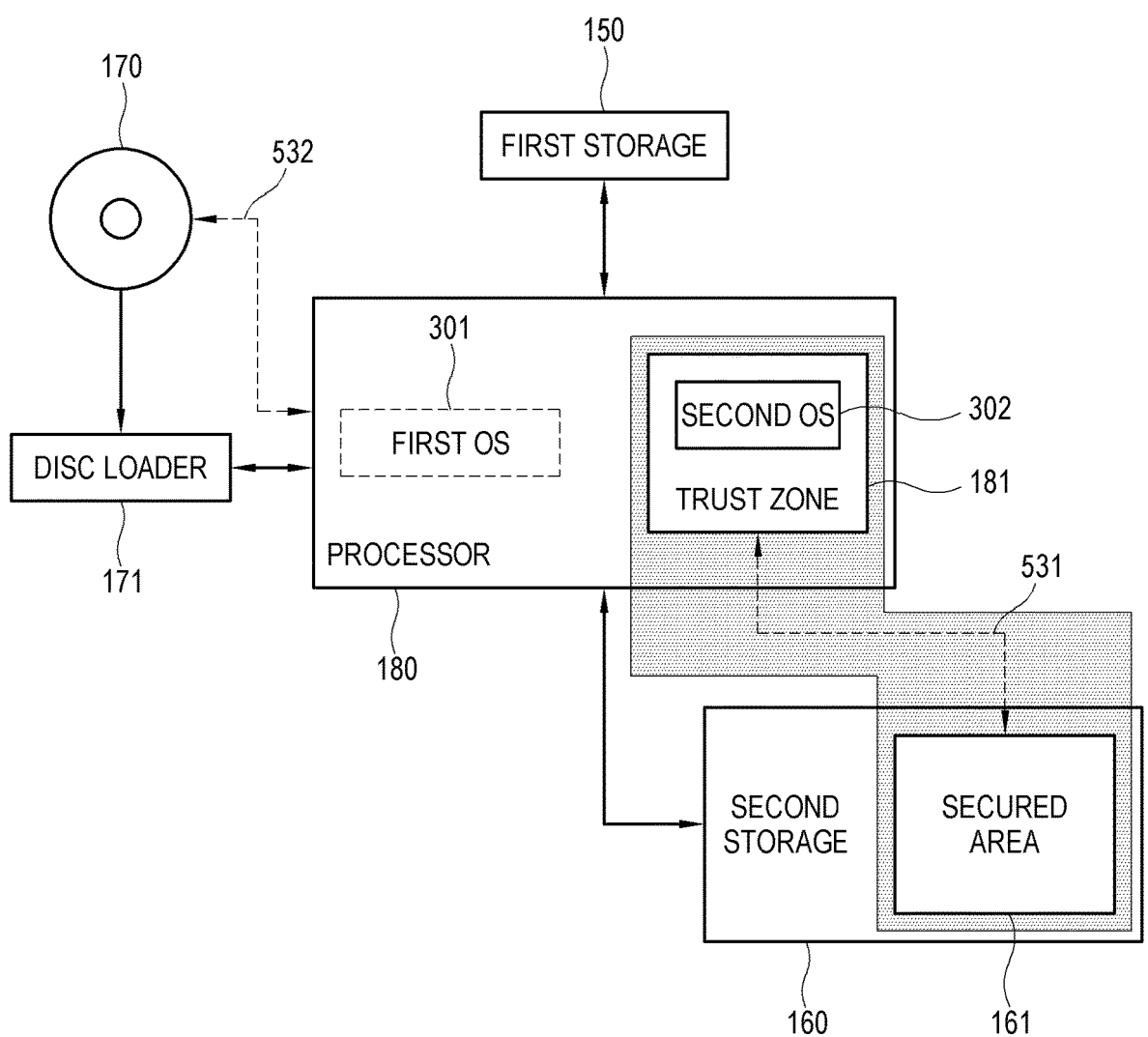
Figure 10:
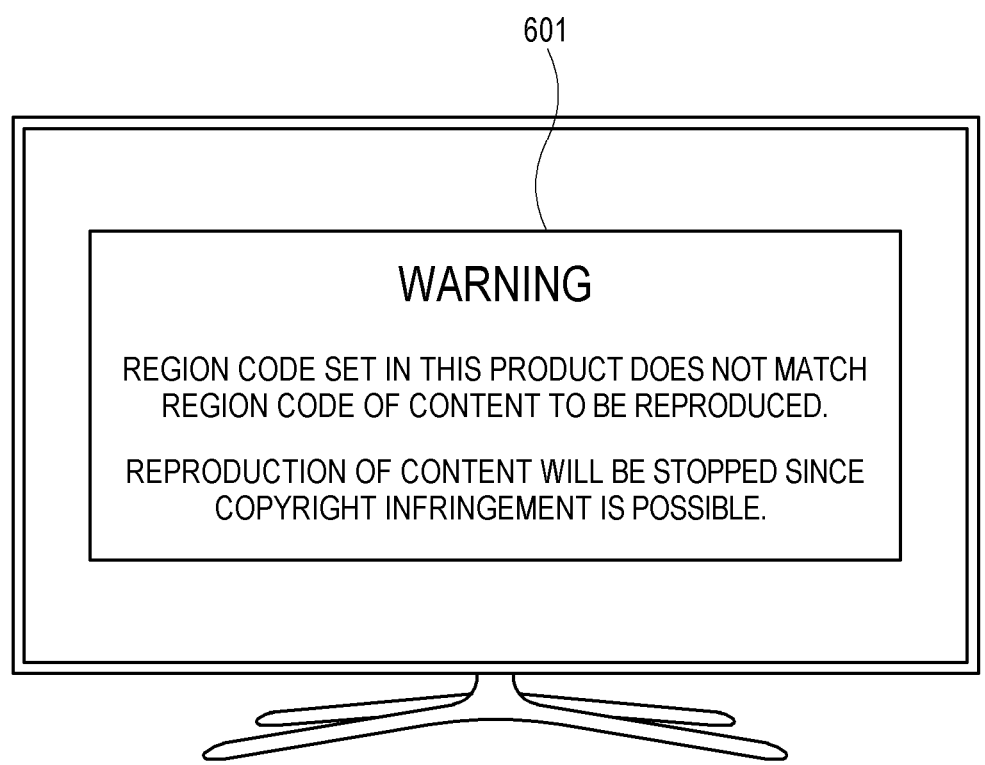

FIG. 7 is a flowchart controlling an electronic apparatus according to a first embodiment of the disclosure, and FIGS. 8 to 10 are drawings for explaining detailed operations of a control method in the electronic apparatus according to the first embodiment of FIG. 7.

As shown in FIG. 7, the processor 180 of the electronic apparatus 100 reads the first code from the first storage 150 in response to occurrence of an event and stores the first code in the secured area 161 of the second storage 160 (510). According to an embodiment, the event may be a predetermined event. Here, the first code may be the first region code showing the regional range of the content reproducible by the electronic apparatus 100.

According to an embodiment, as shown in FIG. 8, the processor 180 reads the first code from the first storage 150 when the second OS 302 operating only in the trust zone 181 is executed (511), and controls the read first code to be stored in the secured area 161 (512).

According to an alternative embodiment, the processor 180 may read the first code from the first storage 150 when the first OS 301 is executed, transmit the read first code to the second OS 302 operating in the trust zone 181, and access the secured area 161 by the second OS 302 to store the first code.

Here, the processor 180 encrypts the first code and stores the encrypted first code in the secured area 161. The encrypted first code may be stored in a previously designated part (or section) of the secured area 161. Thus, the inherent code is not leaked to the outside because the security code is read as null and not identified even though it is forcibly hacked. Here, there are no limits to a method of encrypting the data, i.e. The first code. For example, the algorithm such as RSA and AES for generating a seed with random digits, i.e. random numbers may be used to encrypt the data.

According to an embodiment, the event in the operation 510 may include the first bootup of the electronic apparatus 100. In other words, the processor 180 controls the first code of the first storage 150 to be copied to the secured area 161 of the second storage 160 by the execution of the second OS 302, when the electronic apparatus 100 is booted up as powered on for the first time after it is manufactured/purchased. However, there are no limits to the kind of events in this disclosure, and therefore there may be various points in time for the processor 180 to read and store the first code. For example, the processor 180 may execute the second OS 302, read the first code from the first storage 150 and store the read first code in the secured area 161 when it is detected that a preset specific user's input (key or combination of keys) is received through the user input receiver 140 or a user's input for reproducing content is received for the first time after purchase.

In the electronic apparatus 100 according to the embodiment shown in FIG. 7, the foregoing operation of copying the first code is controlled to be performed once. In other words, if the first code is once stored in the secured area 161 at the first booting point in time after the purchase of the electronic apparatus 100, the processor 190 does not perform the operation of reading the first code from the first storage 150 any more.

The electronic apparatus 100 receives a user's input for a predetermined operation (520). The electronic apparatus 100 may receive a user's input through a remote controller provided as the user input receiver 140, and this user's input may be a command issued to reproduce predetermined content. Here, a user's input may further include a command issued to make the reproduced content, i.e. the corresponding content be output through the wired or wireless connection with the external apparatus 200 (e.g. a TV or the like display apparatus). A user's input in the operation 520 is received after the second booting of the electronic apparatus 100 by way of example, but there are no limits to this example.

According to an embodiment, when a user's input in the operation 520 is a command issued to reproduce content, the content to be reproduced in response to the user's input (i.e. reproduction target content) includes content stored in the disc 170 such as a BD. In this case, the disc 170 may be further stored with the second region code showing the regional range in which the corresponding content is reproducible, and the electronic apparatus 100 obtains the second region code by reading the second region code from the disc 170.

According to an alternative embodiment, when a user's input in the operation 520 is a command issued to reproduce content, the content to be reproduced in response to the user's input (i.e. reproduction target content) includes content received through the communicator 120 by a streaming method. In this case, the electronic apparatus 100 may further receive the second region code showing the regional range, in which the corresponding content is reproducible, through the communicator 120. Here, the second region code may be received as included in the content data, or may be received as encrypted in the form of appended data separated from the content data.

When the user's input in the operation 520 is detected, the processor 180 compares the first code stored in the secured area 161 of the second storage 160 (for example, the first region code showing the regional range of the content reproducible by the electronic apparatus 100) with the second code obtained from the outside (for example, the second region code of the reproducible content) (530). According to an embodiment, as shown in FIG. 9, the processor 180 reads the first region code from the secured area 161 of the second storage 160 in response to the execution of the second OS 302 (531), and reads the second region code from the disc 170 in response to the execution of the first OS 301 (532).

According to an alternative embodiment, the processor 180 reads the first region code from the secured area 161 of the second storage 160 in response to the execution of the second OS 302, and identifies the second region code of the content received through the communicator 120 in response to the execution of the first OS 301.

Here, the processor 180 may execute the second OS 302 within the trust zone 181, read the encrypted first region code from the secured area 161, decrypt the read first region code, and compare the decrypted first region code with the second region code of the content to be reproduced.

The processor 180 identifies whether the first code obtained in the operation 530 and the second code match each other based on the comparison between the first code and the second code (540). According to an embodiment, the processor 180 reads the first code not from the first storage 150 that has a risk of external hacking but instead from the secured area 161 that blocks access from the outside, and compares the read first code with the second code obtained from the outside to thereby prevent content having an unallowed region code from copyright infringement due to illegal reproduction. That is, an inherent code assigned to the electronic apparatus is prevented from being illegally changed by hacking or the like.

When it is identified in the operation 540 that both codes match each other, the processor 180 performs an operation corresponding to the user's input made in the operation 520 (550). As an example of the operation 550, the processor 180 may control the image processor 130 to process an image signal corresponding to reproduction target content when the first region code matches the second region code.

According to an embodiment, the image signal processed in the operation 550 is output to the external apparatus 200 through the connector 110 or the communicator 120 (560). The external apparatus 200 receives the image signal output in the operation 550 through the connector 210 or the communicator 220, and controls the display 290 to display the received image signal.

On the other hand, when it is identified in the operation 540 that both codes do not match each other, i.e. are different from each other, the processor 180 stops operating the electronic apparatus 100 (570). As an example of the operation 570, the processor 180 may stop processing an image signal corresponding to reproduction target content based on the user's input made in the operation 520, and stop the reproduction of the corresponding content. In this case, the content refers to content that is distributed through an illegal channel, and thus the copyright of the content is prevented from infringement. Thus, it is possible to immediately cope with an attempt to illegally change the inherent code by external hacking or the like.

Then, a warning message is output to notify a user of the stop of the operation 570 (580). According to an embodiment, the warning message may be output to notify a user of the stop of reproducing the content. To this end, the processor 180 may open a disc tray, into which the disc 170 is loaded, with or without outputting the warning message so that a user can be notified of the reproduction stop.

Specifically, the processor 180 may control the display 290 of the external apparatus 200 to display a warning message 601 as shown in FIG. 10. In this disclosure, a method of outputting the warning message to a user is not limited to that shown in FIG. 10. Therefore, various warning messages using the electronic apparatus 100 or the external apparatus 200 are possible. For example, a warning message may be output in a voice through a loudspeaker provided in the external apparatus 200 or connected to the electronic apparatus 100 or the external apparatus 200 by a wire or wirelessly, or may be output by making a separate light emitting diode (LED) provided on an external surface (e.g. a front surface) of the electronic apparatus 100 flicker or show a warn sign on a front panel. Further, the warning message may be output by combination of two or more different methods. With the warning message, a user can be aware of why the content is not reproduced.

According to an embodiment, the inherent code is stored as encrypted code in the secured area 161 for blocking an access of a general OS (i.e. the first OS) at the factory of the electronic apparatus 100, and the security OS is executed to read the encrypted region code at the reproduction of the content, thereby identifying whether to reproduce the content.

Therefore, it is not only easy to protect the copyright of the content but also efficiently prevent reproduction of content distributed through an illegal channel because an illegally changed code does not have any effect on identifying whether to reproduce the content even though the inherent code is hacked or illegally changed by illegally adding a microprocessor from the outside and accessing the first storage 150.

According to an embodiment, an electronic apparatus may include a processor and a storage having secured area pre-stored with a first code during manufacturing of the electronic apparatus. The processor may execute a first operating system (OS) configured to perform first operations, and execute a second OS configured to perform second operations, the second OS configured to provide higher security than the first OS. Further, the processor may receive a request for reproducing a content, retrieve the first code from the secured area of the storage during the execution of the second OS, retrieve a second code associated with the content, compare the first code with the second code associated with the content and reproduce the content based on a result of the comparison between the first code and the second code.

Further, the OS and the like resident program are stored in an area other than the secured area 161 of the second storage 160 when the apparatus is manufactured, and the code of which change is possible according to launching regions or the like is separately stored in the secured area 161 by the operation of the foregoing software after factory shipments, thereby minimizing an intervention of manual control under a mass production environment and expecting an effect on enhancing the security without particular change of a manufacturing process. In this case, it is enough to only set the region code corresponding to the sales area in the first storage 150 provided as the auxiliary storage before the factory shipments.

According to an embodiment, an electronic apparatus may include a first storage pre-stored with a first code during manufacturing of the electronic apparatus, a second storage having a secured area and a processor. The process may execute a first operating system (OS) configured to perform first operations and execute a second OS configured to perform second operations, the second OS configured to provide higher security than the first OS. The first operations may be general operations and the second operations may be secured operations requiring higher security than general operations.

The processor may read the first code from the first storage and store the read first code in the secured area of the second storage as second code during the execution of the second OS. The processor may further receive a request for reproducing a content. The content may be a video content or an audio content. Further, the processor may retrieve the second code from the secured area of the second storage and retrieve a third code associated with the content, and compare the second code with the third code associated with the content. Based on a result of the comparison between the second code and the third code, the processor may reproduce the content.

According to an embodiment, the processor may control a display to display the content based on the result of the comparison between the second code and the third code.

According to another embodiment, the processor may output an audio signal through a speaker.

The first code may be read from the first storage and stored in the second storage only when the electronic device is turned on for the first time.

Figure 11:
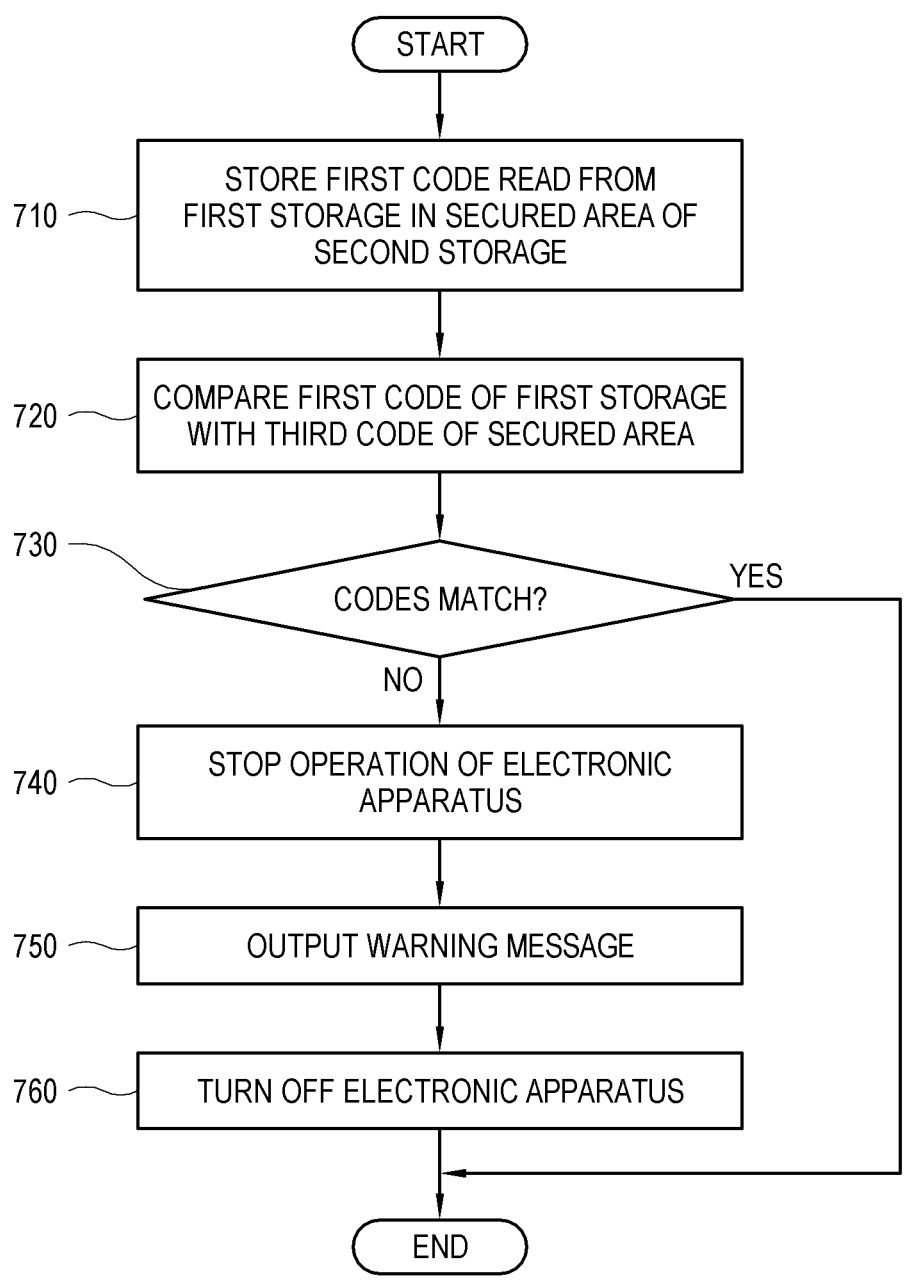
FIG. 11 is a flowchart controlling an electronic apparatus according to a second embodiment of the disclosure.
Figure 12:
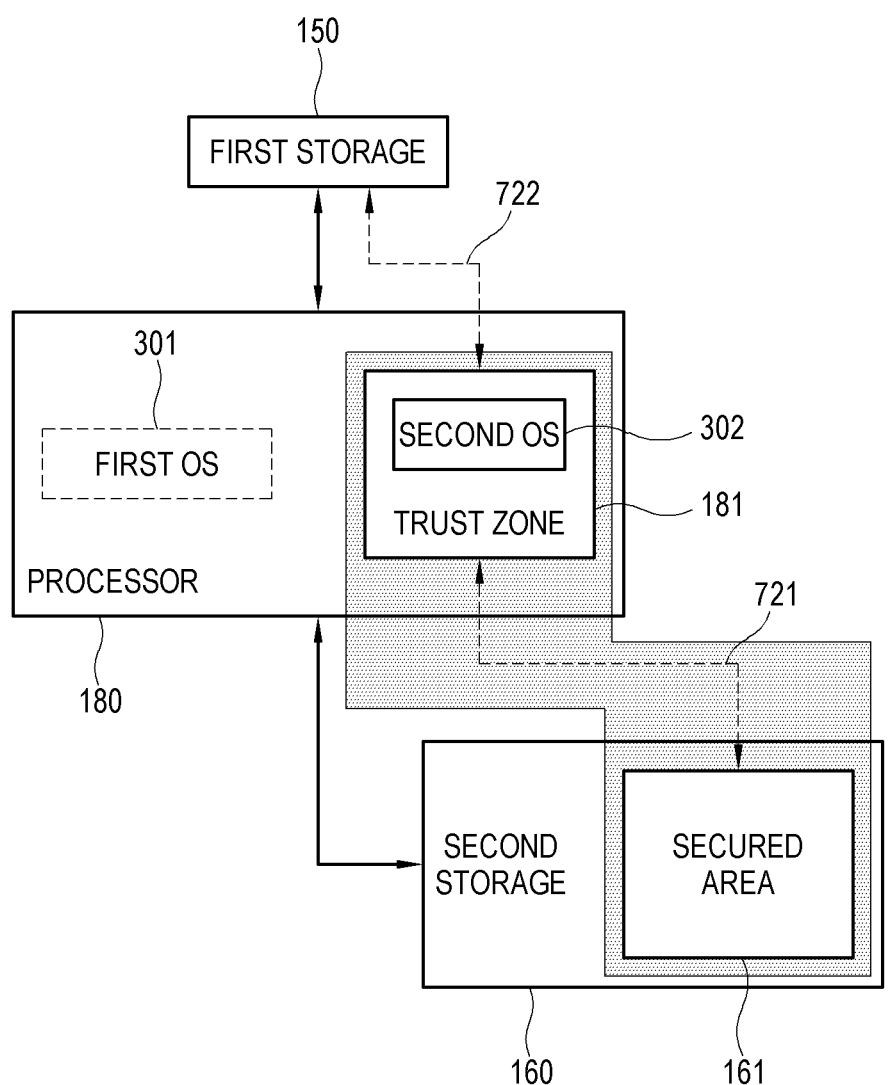
FIGS. 12 and 13 are drawings for explaining detailed operations of a control method in the electronic apparatus according to the second embodiment of FIG. 11.
Figure 13:
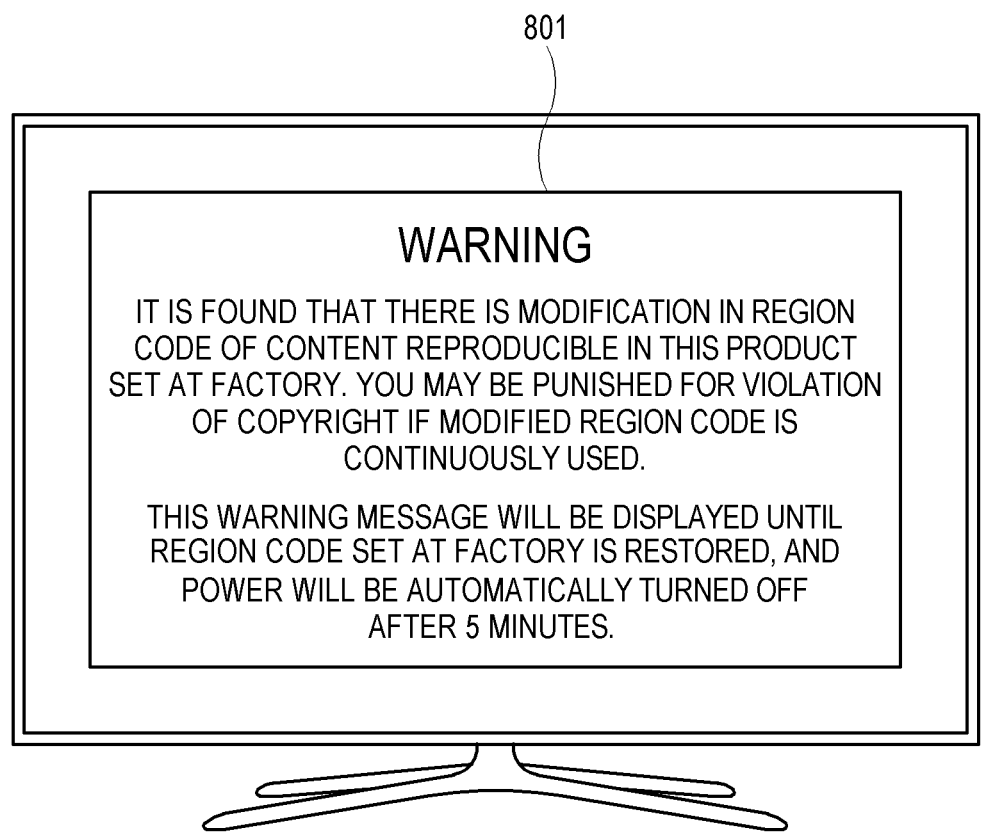

FIG. 11 is a flowchart controlling an electronic apparatus according to a second embodiment of the disclosure, and FIGS. 12 and 13 are drawings for explaining detailed operations of a control method in the electronic apparatus according to the second embodiment of FIG. 11.

As shown in FIG. 11, the processor 180 of the electronic apparatus 100 reads the first code from the first storage 150 and stores, i.e. copies the first code into the secured area 161 of the second storage 160 in response to a predetermined event (710). According to an embodiment, the processor 180 reads the first code from the first storage 150 in response to the execution of the second OS 302 that operates only within the trust zone 181, and controls the read first code to be stored in the secured area 161. According to an alternative embodiment, the processor 180 reads the first code from the first storage 150 in response to the execution of the first OS 301, transmits the read first code to the second OS 302 that operates within the trust zone 181, and accesses the secured area 161 by the second OS 302 to perform control for storing the first code. The processor 180 may use the AES, the RSA or the like algorithm to encrypt the first region code to be stored in the secured area 161, but there are no limits to the encryption method. In the operation 710, examples of the event are the same as those described in the first embodiment of FIG. 7, and a copying process for the region code is controlled to be performed once.

For convenience of description, the foregoing code copied from the first storage 150 and stored in the secured area 161 of the second storage 160 in the operation 710 will be called a third code so as to be distinguished from the first code stored in the first storage 150. The first code and the third code are the region codes showing regional ranges in which reproduction of content is allowed.

The electronic apparatus 100 compares the first code in the first storage 150 with the third code in the secured area 161 of the second storage 160 (720). Specifically, as shown in FIG. 12, the processor 180 reads the third code from the secured area 161 of the second storage 160 (721), and reads the first code from the first storage 150 (722) in response to the execution of the second OS 302. Here, the processor 180 may read the encrypted third code from the secured area 161 by executing the second OS 302 within the trust zone 181, decrypt the read third code, and compare the decrypted third code with the first code read from the first storage 150. The processor 180 may control the second OS 302 to directly read the first code, or control the first OS 301 to read the first code and transmit the read first code to the second OS 302.

The processor 180 identifies whether the first code and the third code match each other based on comparison in the operation 720 between the first code and the third code (730).

According to an embodiment, the operations 720 and 730 for the comparison and the matching-identification between the codes are performed on a predetermined cycle. For example, the electronic apparatus 100 may compare the first code and the third code and identify whether both codes match each other every one or five minutes after booting.

According to an alternative embodiment, the operations 720 and 730 for the comparison and the matching-identification between the codes are performed aperiodically. For example, the processor 180 may compare the first code and the third code and identify whether both codes match each other in response to a predetermined event such as an external input. Alternatively, the first and third codes may be compared and matching-identified randomly.

Meanwhile, a microprocessor circuit for hacking may be illegally added to the electronic apparatus 100. Such an added microprocessor may incapacitate the settings of the inherent code by accessing the first storage 150, hacking the first code, and making the value of the first code be frequently varied differently from the factory-set code set.

For example, a BD player to be released in Korea is factory-set to have a region code of 'A'. Thus, in the operation 710, a value corresponding to the region code of 'A' is copied from the first storage 150 and stored as the third code in the secured area 161 of the second storage 160.

The microprocessor illegally installed in the electronic apparatus 100 may try accessing the first storage 150 and changing the region code set for the first time into another value, e.g. 'C'. However, it is almost impossible for the illegally installed microprocessor to have an access to the secured area 161 of the second storage 160. Although there is a hacking attempt to read the value, it is impossible to identify the value because the value is read as an encrypted and null value. Accordingly, the value is substantially prevented from leaking out.

In this case, the first code and the third code to be subjected to the comparison in the operation 720 are 'C' and 'A', respectively, and thus both codes do not match each other in the operation 730.

When it is identified in the operation 730 that both codes do not match each other, i.e. the first code and the third code are different from each other, the processor 180 stops operating the electronic apparatus 100 (740). In other words, when the codes do not match each other, the electronic apparatus 100 is controlled to stop all operations because it is probable that the first code in the first storage 150 is changed/fabricated by the foregoing illegally installed microprocessor without permission.

A warning message of warning a user about the electronic apparatus 100 stopped in the operation 740 is output (580). For example, the processor 180 may control the display 290 of the external apparatus 200 to display the warning message 801 as shown in FIG. 13. In this disclosure, a method of outputting the warning message to a user is not limited to that shown in FIG. 13. Therefore, various warning messages using the electronic apparatus 100 or the external apparatus 200 are possible. For example, a warning message may be output in a voice through a loudspeaker provided in the external apparatus 200 or connected to the electronic apparatus 100 or the external apparatus 200 by a wire or wirelessly, or may be output by making an LED provided on an external surface (e.g. a front surface) of the electronic apparatus 100 flicker or show a warn sign on a front panel. Further, the warning message may be output by combination of two or more different methods. With the warning message, a user can be aware of probability that the electronic apparatus 100 being used by the user is illegally modified.

Further, the processor 180 finally turns off the electronic apparatus 100 (760). According to an embodiment, the processor 180 may cut off operation power of the electronic apparatus 100 after 5 minutes from the warning message 801 of FIG. 13. However, this disclosure is not limited to this embodiment.

When it is identified in the operation 730 that both codes match each other, the electronic apparatus 100 normally operates because it is not suspected of change in the inherent code.

While the normal operations are maintained as described above, the electronic apparatus 100 may receive a user's input for making a predetermined operation be carried out like the operation 520 of FIG. 7, and then compare the first code of the secured area 161 and the second code (e.g. the second region code of the content) obtained from the outside. In accordance with the comparison results, the operations 530 to 580 are performed in sequence.

In the foregoing second embodiment, the code, of which information is set at the factory, in the first storage 160 is compared with the code, which is stored as encrypted, in the secured area 161 for blocking an access of a general OS (i.e. the first OS); and the operations of the electronic apparatus 100 are stopped, the warning message 604 is output, and the electronic apparatus 100 is turned off when the electronic apparatus 100 is suspected of being illegally installed with the microprocessor circuit intended for hacking, thereby arousing a user's attention to the illegal modification.

Meanwhile, the foregoing embodiments shown in FIGS. 7 and 11 show an example of the secure environment where the trust zone 181 isolated from the outside is provided in the processor 180 of the electronic apparatus 100 as described with reference to FIG. 5 for the sake of division into the normal world and the secure world, and the first OS 301 operates in the normal world and the second OS 302 operates in the secure world. However, the disclosure is not limited to this example.

In other words, according to alternative embodiment, the electronic apparatus may be provided with a plurality of processors, and the first OS and the second OS are executed independently of each other by different processors.

Figure 14:
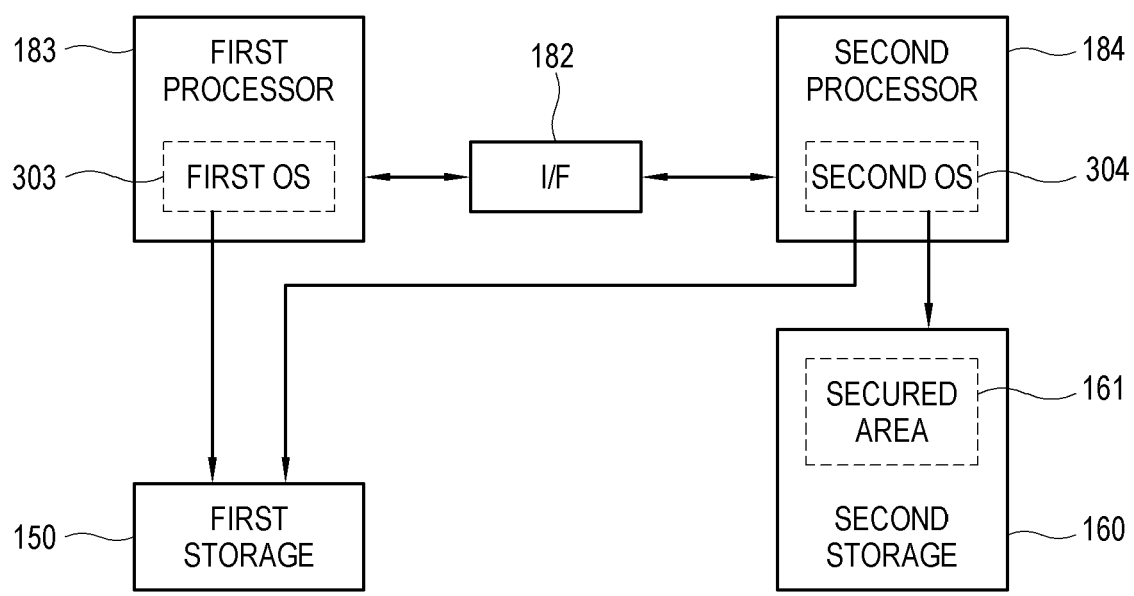
FIG. 14 is a drawing illustrating a relationship between an operating system and a storage in an electronic apparatus according to another embodiment of the disclosure.

FIG. 14 is a drawing illustrating a relationship between an operating system and a storage in an electronic apparatus according to another embodiment of the disclosure.

The first storage 150, the second storage 160, and the like elements provided in an electronic apparatus 101 according to this embodiment shown in FIG. 14 correspond to those having the same terms in the electronic apparatus 100 according to the foregoing embodiment shown in FIG. 5. Therefore, in the electronic apparatus 101 according to this embodiment of FIG. 14, the elements configured to carry out the same operations as those of the electronic apparatus 100 according to the foregoing embodiment will be given the same terms and reference numerals as those of FIG. 5, and detailed descriptions thereof will be omitted to avoid repetitive descriptions.

In the electronic apparatus 101 according to this embodiment of FIG. 14, a first OS 303 is executable by a first processor 183, and a second OS 304 is executable by a second processor 184.

Like the foregoing embodiments, the first OS 303 is defined as an OS loaded in the electronic apparatus 101 and performing general operations. The second OS 304 is different from the first OS 303 and defined as a secured or trusted OS that provides more enhanced security than the first OS 303.

The second processor 184 is for example actualized in the form of a secure chip, i.e. an on-chip processor by making a hardware platform have a secure function to provide a more enhanced secure service. However, the disclosure is not limited to this example. Alternatively, a trust zone, i.e. a separate secured area described in the embodiment of FIG. 5 may be provided in the second processor 184, so that the second OS 304 can operate within the trust zone.

The first processor 183 and the second processor 184 may exchange data in between through an interface (I/F) 182.

In the electronic apparatus 101 of FIG. 14, the first OS 303 and the second OS (or a secured OS) 304 are controlled to be executed by only the first processor 183 and the second processor 184 which are independent of each other, and therefore the access of the first OS 303 is physically completely blocked during the operation of the second OS 304, for example, while the data is being read and written. That is, the operation of the second OS 304 and the access of the first OS 303 are physically completely blocked, thereby providing a securer execution environment.

In this disclosure, the foregoing method of controlling the electronic apparatus based on FIGS. 7 and 11 may be carried out by not only the electronic apparatus 100 according to the embodiment shown in FIG. 5 but also the electronic apparatus 101 according to the embodiment shown in FIG. 14.

Specifically, referring to FIGS. 7 and 14, the second processor 184 of the electronic apparatus 101 reads the first code from the first storage 150 in response to the execution of the second OS 304 when a predetermined event occurs, and stores the read first code in the secured area 161 of the second storage 160 (510). Here, the second processor 184 uses the AES, the RSA or the like algorithm to encrypt and store the first region code in the secured area 161, but there are no limits to the encryption method. In the operation 510, the event may include the first booting of the electronic apparatus 100, and a copying process for the first code may be controlled to be performed once.

The electronic apparatus 101 receives a user's input for a predetermined operation (520). Here, the first processor 183 of the electronic apparatus 101 may detect a user's input received through the remote controller provided as the user input receiver 140. According to an embodiment, the operation 510 may receive a user's input for reproduction of predetermined content, and the content to be reproduced in response to the user's input (i.e. reproduction target content) includes content stored in a BD or the like disc 170 or content received through the communicator 120 by a streaming method.

When the user's input in the operation 520 is detected, the second processor 184 reads the first code from the secured area 161 of the second storage 160 in response to the execution of the second OS 304, and compares the first code with the second code obtained from the outside (530). According to an embodiment, the second code is the second region code of the content to be reproduced in response to the user's input in the operation 510. In this case, the first processor 183 may transmit the second region code of the content, which is read from the disc 170 or received by the streaming method in response to the execution of the first OS 301, to the second processor 184, and the second processor 184 may perform the comparison between the first code and the second code. Further, the second processor 184 may execute the second OS 302 to read the encrypted first region code from the secured area 161, decrypt the read first region code, and compare the decrypted first region code with the second region code for the content to be reproduced.

The second processor 184 identifies whether the first code obtained in the operation 530 and the second code match each other based on the comparison between the first code and the second code (540). When it is identified in the operation 540 that both codes match each other, the second processor 184 performs an operation corresponding to the user's input made in the operation 520 (550). For example, the second processor 184 may control the image processor 130 to process an image signal corresponding to reproduction target content. Here, the second processor 184 notifies the first processor 183 of whether the codes match each other, so that the first processor 183 can perform the operation.

According to an embodiment, the image signal processed in the operation 550 is output to the external apparatus 200 through the connector 110 or the communicator 120 (560). The external apparatus 200 receives the image signal output in the operation 550 through the connector 210 or the communicator 220, and controls the display 290 to display the received image signal.

On the other hand, when it is identified in the operation 540 that both codes do not match each other, the second processor 184 stops operating the electronic apparatus 100 (570). Specifically, the second processor 184 or the first processor 183, which is notified of whether the codes match each other from the second processor 184, stops operation corresponding to the user's input made in the operation 520, for example, stops the process of the image signal corresponding to the reproduction target content to thereby stop the reproduction of the corresponding content.

Then, a warning message is output to notify a user of the stop of the operation 570 (580). The first processor 183 or the second processor 184 may control the display 290 of the external apparatus 200 to display the warning message 601 as shown in FIG. 10.

Meanwhile, referring to FIGS. 11 and 14, the second processor 184 of the electronic apparatus 101 reads the first code from the first storage 150 and stores the first code in the secured area 161 of the second storage 160 in response to the execution of the second OS 304 when a predetermined event occurs (710). Here, the second processor 184 may use the AES, the RSA or the like algorithm to encrypt the first region code to be stored in the secured area 161, but there are no limits to the encryption method. In the operation 710, the event may include the first booting of the electronic apparatus 100, and a copying process for the first code may be controlled to be performed once.

The code copied from the first storage 150 and stored in the secured area 161 of the second storage 160 in the operation 710 will be called the third code so as to be distinguished from the first code stored in the first storage 150. The first code and the third code are the region codes showing regional ranges in which reproduction of content is allowed.

The second processor 184 reads the third code from the secured area 161 of the second storage 160, and compares the third code with the first code of the first storage 150 (720). Here, the second processor 184 may read the encrypted third code from the secured area 161 by executing the second OS 302 within the trust zone 181, decrypt the read third code, and compare the decrypted third code with the first code read from the first storage 150. According to an embodiment, the second processor 184 may directly read the first code from the first storage 150. Alternatively, the first processor 183 may read the first code from the first storage 150 and transmit the read first code to the second processor 184.

The second processor 184 identifies whether the first code and the third code match each other based on comparison in the operation 720 between the first code and the third code (730). According to an embodiment, the operations 720 and 730 for the comparison and the matching-identification between the codes are performed on a predetermined cycle. According to an alternative embodiment, the operations 720 and 730 for the comparison and the matching-identification between the codes may be performed aperiodically, for example, when a predetermined event occurs or randomly.

When it is identified in the operation 730 that both codes do not match each other, i.e. the first code and the third code are different from each other, the second processor 184 or the first processor 183 notified of the code mismatch by the second processor 184 stops operating the electronic apparatus 100 (740).

With the operation stop in the operation 740, the second processor 184 or the first processor 183 notified of the code mismatch by the second processor 184 performs control to output a warning message to a user (580).

Further, the first processor 183 or the second processor 184 finally turns off the electronic apparatus 100 (760).

When it is identified in the operation 730 that both codes match each other, the electronic apparatus 100 normally operates because it is not suspected of change in the inherent code. While the normal operations are maintained as described above, the electronic apparatus 101 may receive a user's input for making a predetermined operation (e.g. reproduction of content) be carried out like the operation 520 of FIG. 7, and then compare the first code of the secured area 161 and the second code obtained from the outside. In accordance with the comparison results, the operations 530 to 580 are performed in sequence.

The electronic apparatus 100, 101 according to the foregoing embodiments of the disclosure may have a reset mode (or a developer mode) with regard to the inherent code. The reset mode refers to a mode for initializing the inherent code stored in the secured area 161 into a factory default state. When the reset mode is executed, the inherent code in the secured area 161 becomes null.

In this disclosure, the reset mode is restricted to be executed by only a product manufacturer or a person concerned (e.g. a developer, a service technician, etc.) under very limited cases, for example, while a product is manufactured at a factory, when there is a need of restoring an illegally changed inherent code to an original code, when the product is in need of repair due to a failure caused by another reason, and so on. In other words, a common user or a hacker cannot enter the reset mode. To this end, a developer or the like can enter the reset mode by a method unpublished to the outside. For example, there may be a method of receiving a password or secret code through a hidden key provided in a special remote controller that is very restrictively distributed, a specific encryption method, a method of using menu stings based on combination of very complicated operations, etc.

When the inherent code of the electronic apparatus 100, 101 is initialized in the reset mode, the code is then stored in the secured area 161 as described with reference to FIGS. 7 and 11, the operations of the electronic apparatus 100, 101 such as content reproduction are controlled based on the code of the secured area 161.

The foregoing embodiments of the disclosure describe that the reproduction of the content is controlled as an operation of the electronic apparatus 100 according to whether the codes match each other, for example, when the inherent code given to the electronic apparatus 100 is the region code. However, the inherent code given to the apparatus of the disclosure is not limited to the region code. Thus, the electronic apparatus 100 may be controlled to perform or stop various operations according to whether the first code stored in the secured area matches the second code obtained from the outside. Further, the electronic apparatus 100 may be controlled to normally perform or stop various operations according to whether the first code stored in the normal area matches the third code copied to the secured area.

In an electronic apparatus, a method of controlling the same, and a recording medium thereof as described above according to the disclosure, a code in the apparatus is stored in a secured area to which only a security OS is accessible, and operations are normally performed only when the code of the secured area matches a code obtained from the outside, thereby having an effect on preventing copyright infringement caused by illegal modification based on hacking or the like in the inherent code assigned to the electronic apparatus and reproduction of content distributed through an abnormal channel.

Further, according to the disclosure, a warning message warns a user of illegal change in the code of the apparatus when the illegal change is detected, thereby having an effect on promoting a consumer's correct awareness of content copyright.

Further, an intervention of manual control is minimized in such a manner that the code in the apparatus is stored in the secured area by operations of software after the apparatus is manufactured, thereby raising productivity and reducing costs under a mass production environment.

Although a few embodiments have been shown and described, it will be appreciated by those skilled in the art that changes may be made in these embodiments without departing from the principles and spirit of the disclosure, the scope of which is defined in the appended claims and their equivalents.

What is claimed is:

1. An electronic apparatus comprising:
    an input receiver configured to receive a user input;
    a first storage stored with a first code;
    a second storage including a secured area; and
    a processor for executing a first operating system (OS) and a second OS having higher security than the first OS, configured to:
        based on the electronic apparatus being powered on and booted for a first time after manufacture, execute the second OS to read the first code from the first storage and store the read first code in the secured area of the second storage,
        execute the first OS to obtain a second code from outside the secured area of the second storage,
        execute the second OS to compare the first code stored in the secured area of the second storage with the obtained second code, and
        based on matching between the first code stored in the secured area of the second storage and the second code, execute the second OS to perform an operation.

2. The electronic apparatus according to claim 1, wherein the secured area of the second storage restricts an access of a first operating system (OS), and
    based on execution of a second OS different from the first OS, the processor stores the first code in the secured area of the second storage and reads the stored first code from the secured area of the second storage.

3. The electronic apparatus according to claim 2, wherein the processor comprises a trust zone which is distinguished from a normal area and in which the second OS is executed.

4. The electronic apparatus according to claim 2, wherein the processor comprises a first processor configured to operate the first OS, and a second processor configured to operate the second OS.

5. The electronic apparatus according to claim 1, wherein, based on occurrence of an event corresponding to first booting of the electronic apparatus or a user's input, the processor reads the first code from the first storage and stores the read first code in the secured area of the second storage.

6. The electronic apparatus according to claim 1, wherein the first code stored in the secured area of the second storage is maintained without change in a value.

7. The electronic apparatus according to claim 1, wherein the first code is encrypted and stored in the secured area of the second storage.

8. The electronic apparatus according to claim 1, wherein the processor is further configured to:
    compare the first code stored in the secured area of the second storage with the first code of the first storage, and
    control the electronic apparatus to stop operating based on mismatching between the first code stored in the secured area and the first code of the first storage.

9. The electronic apparatus according to claim 8, wherein the processor is further configured to control the comparison between the first code of the secured area of the second storage and the first code of the first storage to be made on a predetermined cycle.

10. The electronic apparatus according to claim 1, further comprising:
    an image processor configured to process an image signal, wherein
    the processor is further configured to:
        read the second code from a predetermined area of a disc stored with content, and
        based on matching between the first code and the second code, control the image processor to process the image signal corresponding to the content.

11. The electronic apparatus according to claim 1, wherein the first code and the second code are based on a geographical region.

12. The electronic apparatus according to claim 1, wherein the processor is further configured to read the first code from the first storage and store the read first code in the secured area of the second storage when the electronic apparatus receives a preset specific user's input or receives a user's input for reproducing content for a first time after the user has purchased the electronic apparatus.

13. The electronic apparatus according to claim 1, wherein the processor is further configured to:
    execute, in a first area of the processor, a first operating system (OS) to perform one or more normal operations;
    execute, in a second area of the processor having higher security than the first area of the processor, a second OS perform one or more secure operations, which require higher security than the normal operations;
    read the first code from the first storage only when the second OS is executed in the second area of the processor; and
    store the first code read from the first storage into the secured area of the second storage only when the second OS is executed in the second area of the processor.

14. A method of controlling an electronic apparatus for executing a first operating system (OS) and a second OS having higher security than the first OS, the method comprising:
    based on the electronic apparatus being powered on and booted for a first time after manufacture, executing the second OS to read a first code from a first storage and storing the first code, which is read from the first storage of the electronic apparatus, in a secured area of a second storage of the electronic apparatus;

executing the first OS to obtain a second code from outside the secured area of the second storage;

executing the second OS to compare the first code stored in the secured area of the second storage with the obtained second code; and based on matching between the first code stored in the secured area of the second storage and the second code, execute the second OS to perform an operation.

15. The method according to claim 14, wherein
the secured area of the second storage restricts an access of a first operating system (OS),
the storing comprises storing the first code in the secured area of the second storage based on execution of a second OS different from the first OS, and
the comparing comprises reading the stored first code from the secured area of the second storage based on the execution of the second OS.

16. The method according to claim 15, wherein
a processor of the electronic apparatus comprises a trust zone which is distinguished from a normal area and in which the second OS is executed.

17. The method according to claim 15, wherein
a processor of the electronic apparatus comprises a first processor to operate the first OS, and a second processor to operate the second OS.

18. The method according to claim 14, further comprising:
detecting occurrence of an event corresponding to first booting of the electronic apparatus or a user's input; and
reading the first code from the first storage and storing the read first code in the secured area of the second storage based on the detection of the event.

19. The method according to claim 14, wherein the first code stored in the secured area is maintained without change in a value.

20. The method according to claim 14, further comprising:
encrypting and storing the first code in the secured area.

21. The method according to claim 14, further comprising:
controlling the electronic apparatus to stop operating based on mismatching in comparison between the first code stored in the secured area of the second storage and the first code of the first storage.

22. The method according to claim 14, further comprising:
reading the second code from a predetermined area of a disc stored with content; and
processing the image signal corresponding to the content based on matching between the first code and the second code.

23. A non-transitory computer-readable nonvolatile recording medium recorded with a program of a method executable by a processor of an electronic apparatus for executing a first operating system (OS) and a second OS having higher security than the first OS, the method comprising:
based on the electronic apparatus being powered on and booted for a first time after manufacture, executing the second OS to read a first code from a first storage and storing the first code, which is read from the first storage of the electronic apparatus, in a secured area of a second storage of the electronic apparatus;
executing the first OS to obtain a second code from outside the secured area of the second storage;
executing the second OS to compare the first code stored in the secured area of the second storage with the obtained second code; and
based on matching between the first code stored in the secured area of the second storage and the second code, execute the second OS to perform an operation.

\* \* \* \* \*